(12) United States Patent
Holt et al.

(10) Patent No.: US 11,747,589 B2
(45) Date of Patent: Sep. 5, 2023

(54) PROTECTED REFLECTOR ARRAY FOR A CALIBRATION SYSTEM

(71) Applicant: Labsphere, Inc., North Sutton, NH (US)

(72) Inventors: Jeffrey William Holt, Concord, NH (US); Mark A. Duquette, Andover, NH (US); Michael Wellington Dann, Enfield, NH (US); Erik A Skarin, Sunapee, NH (US); Paul David Mascia, Concord, NH (US)

( * ) Notice: Subject to any disclaimer, the term of this patent is extended or adjusted under 35 U.S.C. 154(b) by 412 days.

(21) Appl. No.: 17/220,258

(22) Filed: Apr. 1, 2021

(65) Prior Publication Data

US 2021/0382264 A1 Dec. 9, 2021

Related U.S. Application Data

(60) Provisional application No. 63/033,930, filed on Jun. 3, 2020.

(51) Int. Cl.
*G02B 7/18* (2021.01)
*G02B 7/182* (2021.01)
*G02B 27/00* (2006.01)

(52) U.S. Cl.
CPC ....... *G02B 7/1821* (2013.01); *G02B 27/0006* (2013.01)

(58) Field of Classification Search
CPC ... G02B 7/16; G02B 7/24; G02B 7/18; G02B 7/182; G02B 7/1821; G02B 7/1827; G02B 26/12; G02B 26/101; G02B 26/105; G02B 26/08; G02B 26/0816; G02B 26/0841; G02B 26/0858; G02B 27/0006; G02B 27/0012; G02B 27/0031; G02B 27/0037; F21V 7/09; F21V 7/041; F21V 7/0025

See application file for complete search history.

(56) References Cited

U.S. PATENT DOCUMENTS

| | | | |
|---|---|---|---|
| 2011/0179791 A1* | 7/2011 | Butler | F24S 50/00 126/684 |
| 2012/0218652 A1* | 8/2012 | Stone | F24S 23/77 359/853 |
| 2013/0327371 A1* | 12/2013 | Hui | H01L 31/0547 359/853 |

* cited by examiner

*Primary Examiner* — Sultan Chowdhury
(74) *Attorney, Agent, or Firm* — Dinsmore & Shohl LLP; Monika Jaensson, Esq.

(57) ABSTRACT

A reflector array includes a base, a rotating support pivotally coupled to the base, and an array actuator comprising a rotating element coupled to the rotating support. The reflector array also includes a plurality of reflectors attached to the rotating support such that the plurality of reflectors rotate in unison in conjunction with one another relative to the base as the array actuator rotates the rotating element. First and second reflectors are coupled to the rotating support via separate reflector support elements that are rotatable to adjust elevation angles of the first and second reflectors.

20 Claims, 11 Drawing Sheets

PROTECTED REFLECTOR ARRAY FOR A CALIBRATION SYSTEM

BACKGROUND

Field

The present specification generally relates to reflector arrays and more particularly to reflector arrays operable to autonomously track the motion of a target to reflect light from an illumination source towards the target, while providing a low-profile design.

Technical Background

Imaging and other sensors deployed on vehicles (e.g., cars, unmanned aerial vehicles, satellites, aircraft, etc.) require regular radiometric and geometric calibration in order to provide accurate measurements of the environment. Regular calibration of such sensors may improve post-process corrections, analysis, and improve the actionable information obtained from such sensors. The benefits of such calibrations may be further enhanced when done in-situ, or when the sensor is deployed under operational conditions in motion (e.g., while in orbit, while in flight, etc.). Accordingly, a need exists for providing flexible calibration targets capable of autonomously tracking sensor systems while in motion to provide real-time assessments of the operational state of the sensor systems.

SUMMARY

According to an embodiment of the present disclosure, a reflector array includes a base, a rotating support pivotally coupled to the base such that the rotating support is rotatable relative to the base in at least a first direction, and an array actuator including a rotating element coupled to the rotating support, the rotating element defining an array axis of rotation of the rotating support. The reflector array also includes a plurality of reflectors attached to the rotating support such that the plurality of reflectors rotate in unison in conjunction with one another relative to the base as the array actuator rotates the rotating element about the array axis of rotation. The plurality of reflectors includes a first reflector coupled to the rotating support via a first reflector support element and a second reflector coupled to the rotating support via a second reflector support element. The first reflector support element and the second reflector support element are rotatable to adjust angles of elevation thereof. The reflector array also includes one or more elevation adjustment actuators rotating the first reflector support element to adjust an elevation angle of the first reflector and the second reflector support element to adjust an elevation angle of the second reflector.

In another embodiment, a reflector array comprises a support structure and a plurality of reflectors coupled to the support structure via a plurality of reflector support elements. Each of the reflector support elements is rotatable relative to the support structure such that the plurality of reflectors are movable to and from a stowed position. Each of the plurality of reflectors is disposed at an opening defined by the support structure. The reflector array also includes plurality of reflector covers, each of the reflector covers attached to a reflector support element proximate to at least one of the plurality of reflectors via a hinged connection disposed on the reflector support element. The reflector array also includes a plurality of cover latches, each one of the plurality of cover latches forming a latch-cover pair with one of the plurality of reflector covers, wherein the relative positioning between each of the plurality of reflectors and an associated one of the plurality of reflector covers changes as that reflector rotates towards the stowed position such that the associated reflector cover engages with the cover latch in that reflector cover's reflector-latch pair at an engagement position to enclose a cavity in which the reflector is disposed.

In another embodiment, a method of providing an illumination signal to a remote sensing system includes determining a positioning of the remote sensing system relative to a reflector array. The reflector array includes a base, a rotating support pivotally coupled to the base such that the rotating support is rotatable relative to the base about an array axis of rotation extending in a first direction, an array actuator comprising a rotating element coupled to the rotating support, the rotating element defining the array axis of rotation, and a plurality of reflectors pivotally coupled to the rotating support via one or more elevation adjustment actuators, the plurality of reflectors rotatable about at least one elevation axis extending in a second direction. The method also includes, based on the positioning, rotating the rotating support about the array axis of rotation via the array actuator such that the plurality of reflectors reflect light from an illumination source in an azimuthal direction towards the remote sensing system. The method also includes rotating at least a portion of the plurality of reflectors about the at least one elevation axis such that at least a portion of the plurality of reflectors direct light from the illumination source to a field of view of the remote sensing system.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
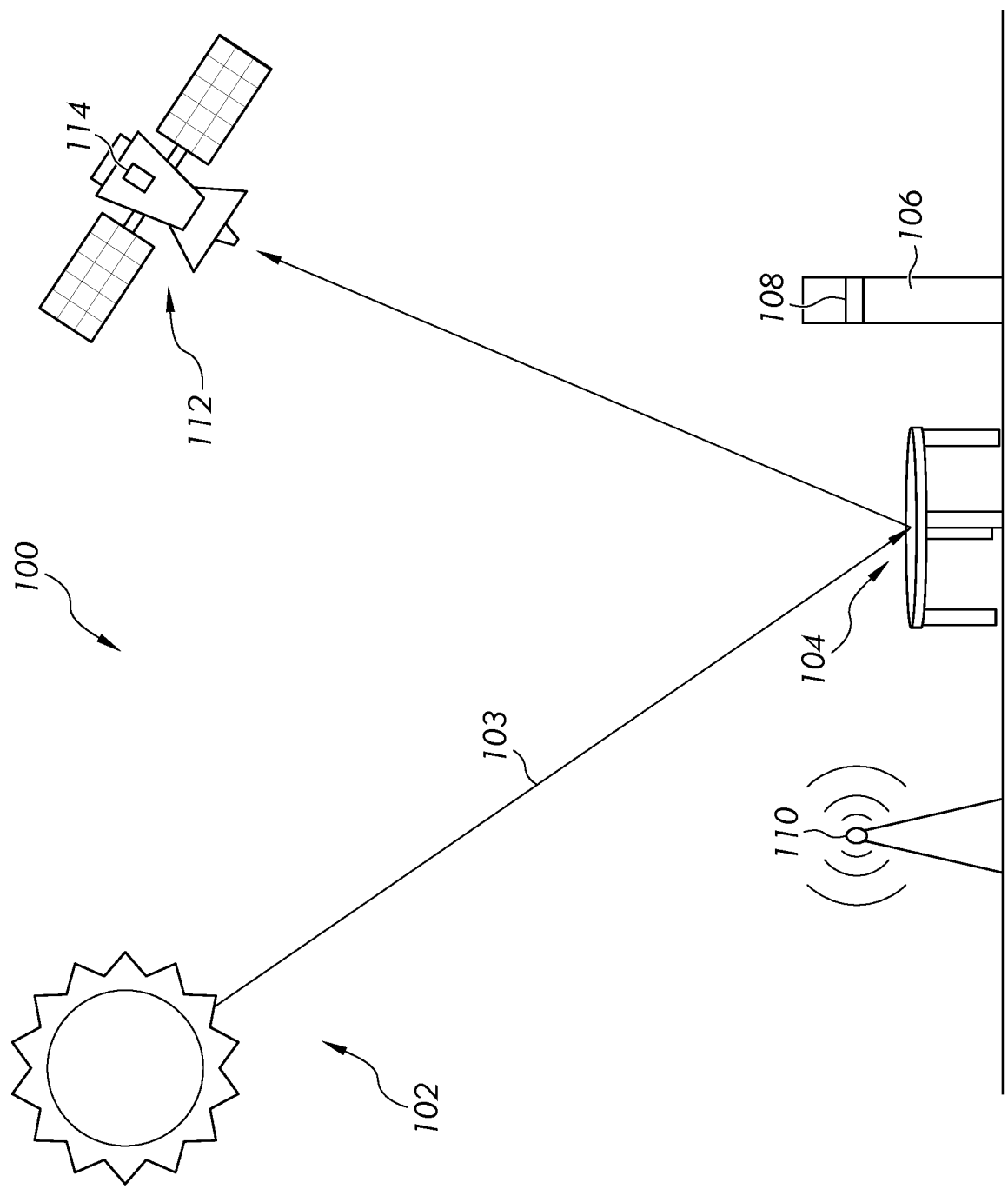
FIG. 1 schematically an imager characterization system including a reflector array, according to one or more embodiments described herein.

Reference will now be made in detail to embodiments of reflector arrays for use in calibrating imaging systems. The reflector arrays described herein may be used to provide illumination light from an illumination source to imaging systems while the imaging systems are deployed in an operational environment (e.g., in flight or orbit) so the imaging systems may generate calibration signals for assessment and further analysis. Given this, the reflector arrays described herein facilitate adjustment of the angular orientation of the plurality of reflectors about multiple axes of rotation to enable the reflector array to track the positioning of an imaging system in real time so that the reflectors reflect the illumination light towards the imaging system. The plurality of reflectors may be attached to a rotating support that is pivotally coupled to a support structure such that the plurality of reflectors rotate in unison with the rotating support about an array axis of rotation to facilitate adjustment of an azimuthal orientation of the plurality of reflectors. Each reflector may also be coupled to the rotating support via a reflector support element that is rotatable relative to the rotating support about an elevation axis extending perpendicular to the array axis to facilitate adjustment of an elevation angle of each reflector. In embodiments, the rotating support is a plate having an opening, and each reflector support element is disposed proximate to the opening such that the reflector support element rotates within the opening. Each of the reflectors may be rotated to a stowed position where the reflectors face towards a surface upon which the reflector array is disposed and each reflector support element is co-planar with the rotating support. Such a co-planar design limits the cross-sectional size of the reflector array to reduce wind damage and the like while still providing robust structural support.

In an additional aspect, the reflector array may include at least one reflector cover (e.g., two or more reflector covers) covering at least one of the plurality of reflectors to protect the reflector when not in use. The at least one reflector cover may be attached to the reflector support element associated with a reflector via a hinged connection. As the reflector rotates from a reflecting position (e.g., where the reflector points away from a surface upon which the reflector array is disposed) towards the stowed position about an elevation axis, the reflector may rotate towards the reflector cover. The reflector cover may be pressed against the reflector support element such that the reflector is disposed in a sealed cavity formed by the reflector cover and the reflector support element. In embodiments, a cover latch secures the reflector cover to the reflector support element to maintain the sealing of the cavity irrespective of the rotational position of the reflector support element. Such a hinged reflector cover design beneficially enables covering of the plurality of reflectors when not in use while the covers are positioned in manner that does not obstruct illumination light from reaching the reflectors.

The reflector arrays described herein are highly flexible in terms of the number and characteristics of reflectors that may be provided therein. For example, in embodiments, each reflector support element may support any number of reflectors (e.g., ranging from one reflector to five or more reflectors) such that the reflector arrays described herein may include anywhere from 2 to 50 reflectors, or even more. Additionally, each reflector array may include a plurality of different sizes of reflectors to facilitate calibration of imaging systems having different characteristics (e.g., ground resolving distance, detector element size, etc.). Reflectors included on the reflector array may also vary in other characteristics, such as polarization, spectral reflectance, and the like to facilitate a plurality of different types of imaging system characterizations.

FIG. 1 schematically depicts an imager characterization system 100, according to an example embodiment. The imager characterization system includes an illumination source 102, a reflector array 104, a control system 106, and a field spectral radiometer 108. The imager characterization system 100 is generally configured to direct light from an illumination source 102 to an imaging system 112 to facilitate calibration of the imaging system 112 while the imaging system 112 is in deployment. The illumination source 102 provides illumination light for generating samples for characterizing the imaging system 112. In the example shown, the illumination source 102 is sunlight, though other illumination sources are contemplated and within the scope of the present disclosure. In embodiments, the reflector array 104 and control system 106 comprise one of a plurality of reference sites that are a part of a calibration network for characterizing the imaging system 112.

The control system 106 communicates with the imaging system 112 (e.g., via a network) and controls the reflector array 104. In embodiments, the imager characterization system 100 provides on demand calibration for the imaging system 112 in response to a calibration request. For example, in embodiments, the imaging system 112 transmits the calibration request to the imager characterization system 100 (e.g., via any known communication protocol). The calibration request may indicate a calibration time when the reflector array 104 is within a field of view of the imaging system 112. At the indicated time, the control system 106 may measure solar radiance, atmospheric transmission, and reflectance from the reflector array 104 and control the reflector array 104 to direct illumination light from the illumination source 102 to the imaging system 112 for calibration. The spectral radiance and/or irradiance of the illumination source 102 (e.g., of the sun and sky), atmospheric transmission, and the like may be measured by the field spectral radiometer 108. In embodiments, the orientation of the field spectral radiometer 108 is adjustable to acquire a complete survey of the environment of the reflector array 104 to facilitate proper adjustments to the samples generated by the imaging system 112. In embodiments, the imager characterization system 100 includes a camera (not depicted). The camera may be co-located with a remote sensing head of the field spectral radiometer 108 and be used for alignment, tracking, and targeting to ensure that the field spectral radiometer 108 is sampling a desired target.

The imaging system 112 is depicted as a satellite imaging system, but it should be understood that the systems and methods described herein are applicable to various types of imaging systems (e.g., imaging systems disposed on unmanned aerial vehicles or other aircraft, imaging systems disposed on ground-based vehicles). In the depicted embodiment, the imaging system 112 includes one or more sensors 114. The one or more sensors 114 are generally configured to generate images based on radiation within a wavelength range of interest. The wavelength range of interest may vary depending on the implementation. For example, in embodiments, the one or more sensors 114 may generate images based on one or more of ultraviolet radiation, visible light, infrared radiation, and even the millimeter wavelength range or radio frequency.

The imaging system 112 may perform a number of different types of imaging of targets depending on the situation or implementation. For example, in embodiments, the imaging system is a remote sensing system using broadband, multi-spectral, and/or hyperspectral imaging instruments. Such instrumentation requires proper calibration in order to achieve reliable characterizations of the targets being imaged because the acquired imaging signal by the one or more sensors 114 may vary depending on a number of different factors, such as angle of illumination (e.g., orientation of the illumination source 102), the spectral composition of illumination light from the illumination source 102, atmospheric conditions, and reflectance of surfaces disposed proximate to the reflector array 104 (e.g., the bidirectional reflectance distribution function ("BRDF") of the surface upon which the reflector array 104 is disposed). To facilitate accurate calibration of a wide array of imaging systems 112, the field spectral radiometer 108 includes two or more optical paths coupled to detector paths specifically designed for different optical channels (e.g., wavelength ranges of interest), providing for high dynamic range and low signal to noise environmental measurements across a large spectral range.

Figure 2A:
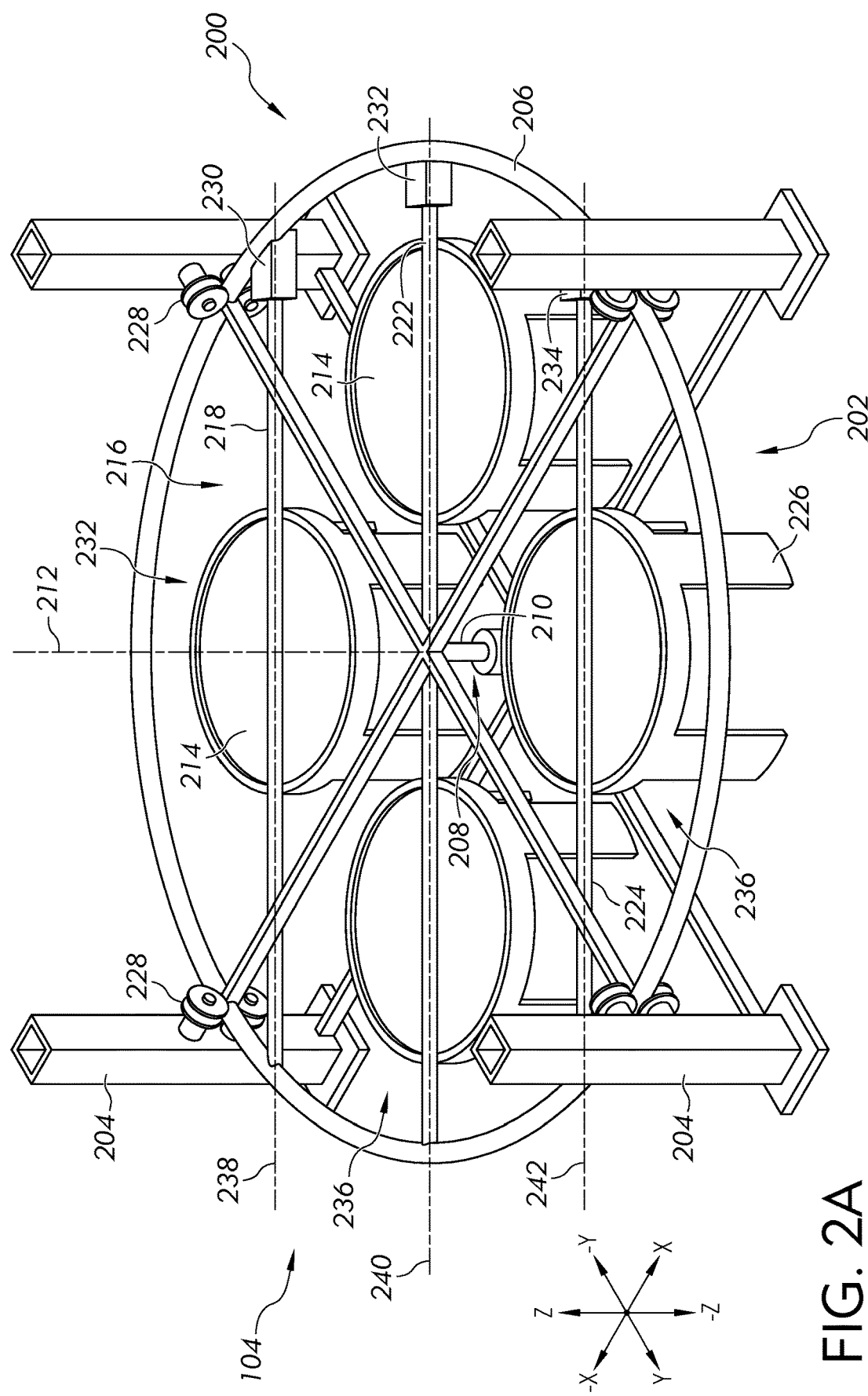
FIG. 2A schematically depicts the reflector array of the imager characterization system depicted in FIG. 1 with a plurality of reflectors in a stowed position, according to one or more embodiments described herein.
Figure 2B:
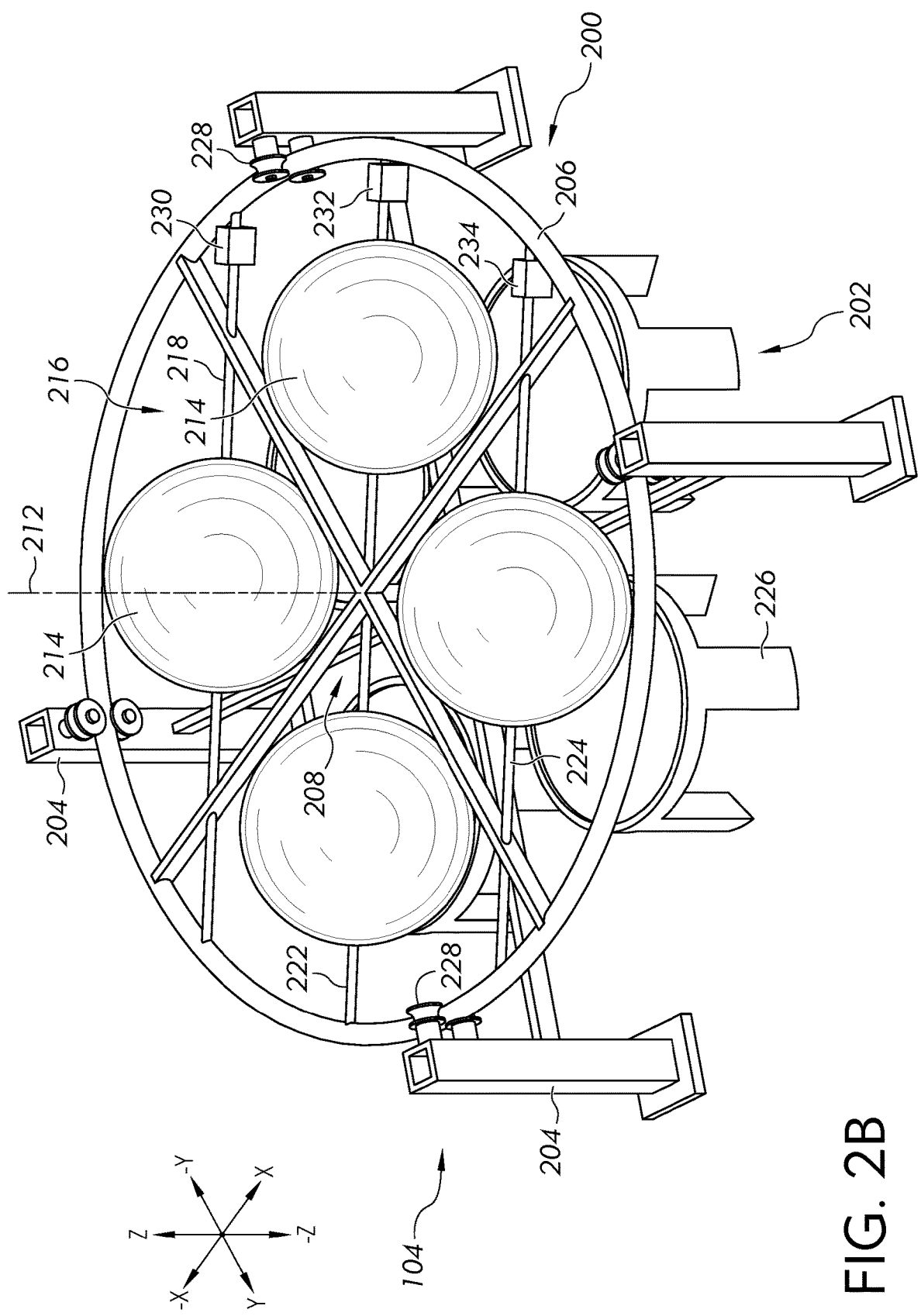
FIG. 2B schematically depicts the reflector array of the imager characterization system depicted in FIG. 1 with a plurality of reflectors in a reflecting position, according to one or more embodiments described herein.

FIGS. 2A and 2B schematically depict an example embodiment of the reflector array 104 in greater detail. FIG. 2A depicts the reflector array 104 with a plurality of reflectors 214 in a stowed position where light from the illumination source 102 is not reflected towards the imaging system 112. FIG. 2B depicts the reflector array 104 in a reflecting position where the reflector array 104 is positioned to direct light from the illumination source 102 into the field of view of the imaging system 112. In the depicted embodiment, the reflector array 104 includes a plurality of reflectors 214. The plurality of reflectors 214 are arranged in a 2×2 array, although other arrangements and numbers of reflectors are contemplated and within the scope of the present disclosure. For example, in embodiments, the plurality of reflectors 214 are arranged in four rows of reflectors, with each row of reflectors being support by a different reflector support element. Two outer ones of the reflector support elements may have two reflectors attached thereto, while two inner ones of the reflector support elements may have four reflectors attached thereto, such that the reflector array has a total of 12 reflectors. Various other arrangements are possible.

As depicted in FIG. 2A, the reflector array 104 includes a support structure 200 supporting the plurality of reflectors 214 in a plane above the surface upon which the reflector array 104 is disposed. The nature of the surface may vary. For example, in embodiments, the surface corresponds to a surface upon which a plurality of components (e.g., the reflector array 104, the control system 106, and the antenna 110) of the imager characterization system 100 depicted in FIG. 1 are disposed. In embodiments, the surface may correspond to an environmental surface or the ground (e.g., pavement, grass, water etc.). In embodiments, the reflector array 104 may be attached to a floating structure (e.g., the support structure 200 may include a buoyant portion to facilitate the reflector array 104 floating on water or other suitable fluid). In embodiments, the reflector array 104 (and other components of the imager characterization system 100) is disposed on a movable entity or vehicle, and the surface may correspond to a surface of the vehicle. The surface may largely vary in reflectance attributes and have various different dependencies on viewing angle depending on the situation in which the reflector array 104 is being used.

The support structure 200 includes a base 202 and a rotating support 206 coupled to the base 202. Each of the plurality of reflectors 214 is connected to the base 202 via the rotating support 206. In embodiments, the base 202 may be stationary in the reference frame of the surface upon which the reflector array 104 is disposed. The base 202 provides structural support for the plurality of reflectors 214 and maintains positioning of the plurality of reflectors 214 during use. The base 202 includes a plurality of legs 204 attached to one another by support elements. Each of the plurality of legs 204 includes an engagement assembly 228 that receives and secures the rotating support 206. It should be understood that, while the depicted embodiment includes a single rotating support 206 coupled to each of the plurality of legs 204, alternative embodiments may include a plurality of rotating supports, with only a portion of the plurality of legs 204 engaging with each rotating support 206. Such an embodiment may permit independent rotation control of different groupings of the plurality of reflectors 214 attached to each rotating support 206. Additionally, while the base 202 is depicted as incorporating a plurality of legs 204, the base 202 may take a number of different forms depending on the size of the reflector array 104 supported thereby (e.g., number and size of reflectors) and the operational environment of the reflector array 104. For example, in embodiments, the base 202 may include a single support platform centrally disposed relative to the rotating support 206. In embodiments, the base may define a single surface upon which the rotating support 206 is disposed.

In the depicted embodiment, each engagement assembly 228 is a roller assembly disposed on a surface of one of the legs 204. Each roller assembly includes a pair of rollers between which the rotating support 206 is disposed. Attachment of the rotating support 206 to the base 202 via the rollers beneficially permits rotation of the rotating support 206 relative to the base 202 in the manner described herein and maintains planarity of the rotating support 206 by providing a plurality of points of support. Such maintenance of the shape of the rotating support 206 beneficially maintains the pointing accuracy of the plurality of reflectors 214 because, if the rotating support 206 is bent, actual pointing directions of the plurality of reflectors 214 may vary from intended directions if the bending is unaccounted for in the control of the reflector array 104. The rollers also beneficially suppress vibration modes associated with the structure of the rotating support 206.

In embodiments, each engagement assembly 228 is movable relative to the leg 204 upon which that engagement assembly 228 is disposed. For example, each engagement assembly 228 may be attached to an associated one of the legs 204 via a track or slot within that leg. The track or slot may extend in a lengthwise direction of the leg 204 to permit movement of the engagement assembly 228 (and therefore the rotating support 206) relative to the base 202 in the lengthwise direction (e.g., the Z-direction of the coordinate axis depicted in FIG. 3A). That is, in the embodiment depicted in FIGS. 2A and 2B, the rotating support 206 is movable relative to the base 202 in a direction extending generally perpendicular to the surface upon which the reflector array is disposed. Alternative embodiments for achieving such mobility of the rotating support 206 are contemplated and within the scope of the present disclosure. For example, in embodiments, the rotating support 206 is attached to a portion of the legs 204 that are movable relative to remaining portions of the legs 204 (e.g., the legs 204 may be telescoping assemblies with variable length).

In the embodiment depicted in FIGS. 2A and 2B, translational movement of the rotating support 206 is provided by an array actuator 208 centrally disposed within the base 202. The array actuator 208 may be any suitable type of actuator (e.g., pneumatic, electrical, hydraulic, and the like). The array actuator 208 includes a moving element 210 attached to the rotating support 206. The array actuator 208 applies force to the rotating support 206 via the array actuator 208 to facilitate translation of the rotating support 206 (and therefore the plurality of reflectors 214) towards and away from the surface upon which the reflector array 104 is disposed. Additionally, the array actuator 208 may rotate the moving element 210 about an array axis of rotation 212 extending through the rotating support 206. Since each of the plurality of reflectors 214 is coupled to the rotating support 206, each of the plurality of reflectors 214 rotate in conjunction with the rotating support 206 about the array axis of rotation 212 to facilitate adjustment of the azimuthal orientation of the plurality of reflectors 214 and reflection towards a particular imaging system. Such a configuration permitting uniform azimuthal rotation facilitates efficient adjustment of the pointing direction of large numbers of reflectors in real-time to track imaging systems.

The plurality of reflectors 214 are coupled to the rotating support 206 via a plurality of reflector support elements 216. Each reflector support element of the plurality of reflector support elements 216 may have at least one of the plurality of reflectors 214 attached thereto. The plurality of reflector support elements 216 may take a variety of forms depending on the implementation. For example, in the depicted embodiment, the plurality of reflector support elements 216 includes a first reflector support element 218 having one of the plurality of reflectors 214 attached thereto, a second reflector support element 220 having two of the plurality of reflectors 214 attached thereto, and a third reflector support element 224 having one the plurality of reflectors 214 attached thereto. The first, second, and third reflector support elements 218, 222, and 224 are each bars extending between an outer ring defined by the rotating support 206. In embodiments, the first, second, and third reflector support elements 218, 222, and 224 are plates including a dimension (e.g., width) that is at last as large as a dimension (e.g., diameter) of the portion of the plurality of reflectors 214 attached thereto.

To facilitate movement of the plurality of reflectors to and from the stowed position depicted in FIG. 2A, the plurality of reflector support elements 216 may be rotatable relative to the rotating support 206. As depicted in FIG. 2A, the first reflector support element 218 is rotatable about a first elevation axis 238, the second reflector support element 220 is rotatable about a second elevation axis 240, and the third reflector support element 224 is rotatable about a third elevation axis 242. In the depicted embodiment, the first, second, and third elevation axes 238, 240, and 242 extend through the rotating support 206 such that the plurality of reflectors 214 are co-planar with the rotating support 206 when rotated to extend parallel to the surface upon which the reflector array 104 is disposed. Such a co-planar configuration enhances durability by reducing cross-sections subjected to wind loads when the reflector array 104 is placed in a harsh environment.

Controlled adjustment of the rotation of the plurality of reflector support elements 216 is achieved via at least one elevation adjustment actuator. For example, as depicted in FIG. 2A, the reflector array 104 includes a first elevation adjustment actuator 230 that adjusts an angle of rotation of the first reflector support element 218 about the first elevation axis 238, a second elevation adjustment actuator 232 that adjusts an angle of rotation of the second reflector support element 222 about the second elevation axis 240, and a third elevation adjustment actuator 234 that adjusts an angle of rotation of the third reflector support element 224 about the third elevation axis 242. The elevation adjustment actuators 230, 232, and 234 may be any suitable type of actuator for rotating the first, second, and third reflector support elements 218, 220, and 224. Such an arrangement beneficially allows independent adjustment of the elevation angles of the portions of the plurality of reflectors 214 attached to each of the first, second, and third reflector support elements 218, 220, and 224 to allow adjustment of the portion of the plurality of reflectors 214 that directs light towards an imaging system. By adjusting the elevation angle of different groups of reflectors 214, the amplitude of light directed to an imaging system may be modulated and the dynamic range of the light reflected may be quickly tuned. The individual elevation adjustment actuators 230, 232, and 234 may also be used to create a pulse-like effects with groupings of mirrors quickly in and out of view at a tunable frequency. In embodiments, such effects may also be achieved by actuators associated with each individual one of the plurality of reflectors 214 (e.g., each individual one of the plurality of reflectors 214 may be coupled to a reflector support element via a servo-based actuator capable of slightly tipping each mirror by 5 degrees in a particular direction). In embodiments, the reflector array 104 only includes a single elevation adjustment actuator and elevation angle of the plurality of reflectors 214 may be adjusted in unison by mechanical linkages between the plurality of reflector support elements 216.

Referring still to FIG. 2A, the reflector array 104 includes a plurality of support platforms 226 coupled to the base 202. When the plurality of reflectors 214 are in the stowed position, reflective surfaces of the plurality of reflectors 214 rest on the plurality of support platforms 226 such that the reflective surfaces are disposed in cavities defined by the plurality of reflectors 214 and the support platforms 226 to protect the reflective surface from the external environment. That is, to place the plurality of reflectors 214 in the stowed position, the plurality of reflectors are first rotated about elevation axes associated with the plurality of reflector support elements 216 such that reflective surfaces of the plurality of reflectors 214 point towards the plurality of support platforms 226, the azimuthal angle of the rotating support 206 is adjusted via the array actuator 208 until the plurality of reflectors 214 are each aligned with one of the plurality of support platforms 226, and the plurality of reflectors 214 are lowered into contact with the plurality of support platforms 226 such that the reflective surfaces are each sealed within a cavity.

Referring now to FIG. 2B, to remove the plurality of reflectors 214 from the stowed position depicted in FIG. 2A to a reflecting position where the plurality of reflectors 214 reflect light from the illumination source 102 towards an imaging system 112 (see FIG. 1), the array actuator 208 moves the rotating support 206 away from the base 202 to allow rotation of the plurality of the plurality of reflectors 214 relative to the support platforms 226. Angles of elevation and azimuthal orientation are then adjusted via the elevation adjustment actuators 230, 232, and 234, and the array actuator 208, respectively, based on the relative positioning of the imaging system 112 and the illumination source 102 such that light from the illumination source 102 is directed towards the imaging system 112 by at least a portion of the plurality of reflectors 214. The structure of the reflector array 104 allows simultaneous adjustment of the plurality of reflectors 214 in both the elevation and azimuthal directions, facilitating efficient transitions from the stowed position to reflecting position for system calibration.

In the depicted embodiment, each of the plurality of reflectors 214 of the reflector array 104 is a convex reflector having a similar shape and size. In embodiments, the plurality of reflectors 214 are broadband reflectors configured to reflect light from the illumination source 102 over a relatively wide wavelength range of interest. In embodiments, the plurality of reflectors 214 comprise convex reflective surfaces coated by a spectrally neutral coating (e.g., aluminum) so that the plurality of reflectors 214 only reflect illumination light from a particular illumination source 102 (e.g., the sun). In embodiments, at least a portion of the plurality of reflectors 214 include a polarized coating such that, depending on the look angle of the plurality of reflectors 214 and the angle of incidence of the light from the illumination source 102, the plurality of reflectors 214 provide varying degrees of polarized light towards the imaging system 112. In embodiments, at least a portion of the plurality of reflectors 214 is coated with one or more bandpass coatings. The bandpass coatings may be selected such that different reflectors reflect different spectral portions of light from the illumination source 102 so that light possessing a tunable spectral signature is directed towards the imaging system 112 to calibrate the imaging system 112 to a particular spectral distribution.

While the reflector array 104 is described as having only a plurality of reflectors 214 attached thereto via a rotatable plurality of reflector support elements 216, it should be understood that certain embodiments may include elements other than reflectors. For example, certain embodiments may include a diffuse reflectance target attached to one of the plurality of reflector support elements 216 to provide a reflectance reference for measurements. Embodiments may also include an illumination source coupled to one of the plurality of reflector support elements. The illumination source may emit a well-defined calibration light directly to the imaging system 112 for calibration. The calibration light may emit light within a predetermined spectral band of interest and be disposed on an movable support structure (e.g., a robotic arm, rotation stage, or other suitable support structure) to track the location of the imaging system. The response of the imaging system 112 to the calibration light may be used to determine information regarding the operating environment of the reflector array 104 (e.g., weather conditions, surface conditions, or the like).

In embodiments, each of the plurality of reflectors 214 may be concave, convex, or flat, depending on the implementation. In embodiments, each of the reflectors 214 is sized less than an instantaneous geometric field of view ("IGFOV") of an individual detector element (e.g., pixel) the imaging system 112. That is, each of the reflectors 214 may have a surface area facing the illumination source 102 that is less than or equal to a geometric area captured by one of the detector elements. In embodiments, the IGFOV of one of detector elements may be approximated as $$IGFOV = \frac{ah}{f} \quad (1)$$

where a represents the dimension of one of the detector elements (e.g., in embodiments where each detector elements is an a×a square pixel), f is the effective focal length of an optical system (not depicted) of the imaging system 112, and h is the height of the optical system above of the reflector array 104 (e.g., the orbital height of the imaging system 112). That is, light reflected from each of the reflectors 214 may represent a point illumination source that is imaged by the imaging system 112. In embodiments, the reflector array 104 includes a plurality of arrays of reflectors within a single IGFOV of the imaging system 102.

Figure 3A:
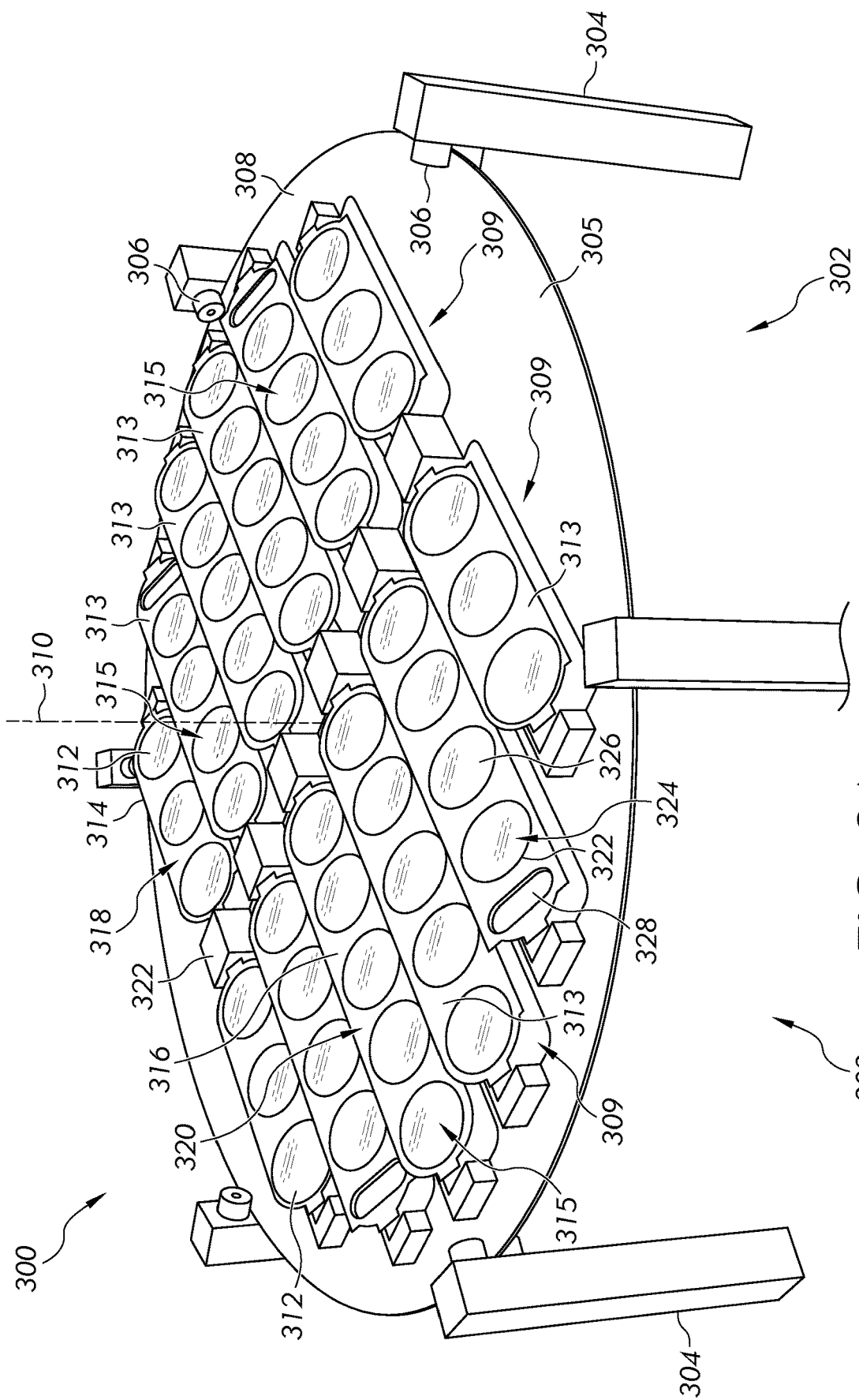
FIG. 3A schematically depicts a reflector array with a plurality of reflectors in a reflecting position, according to one or more embodiments described herein.
Figure 3B:
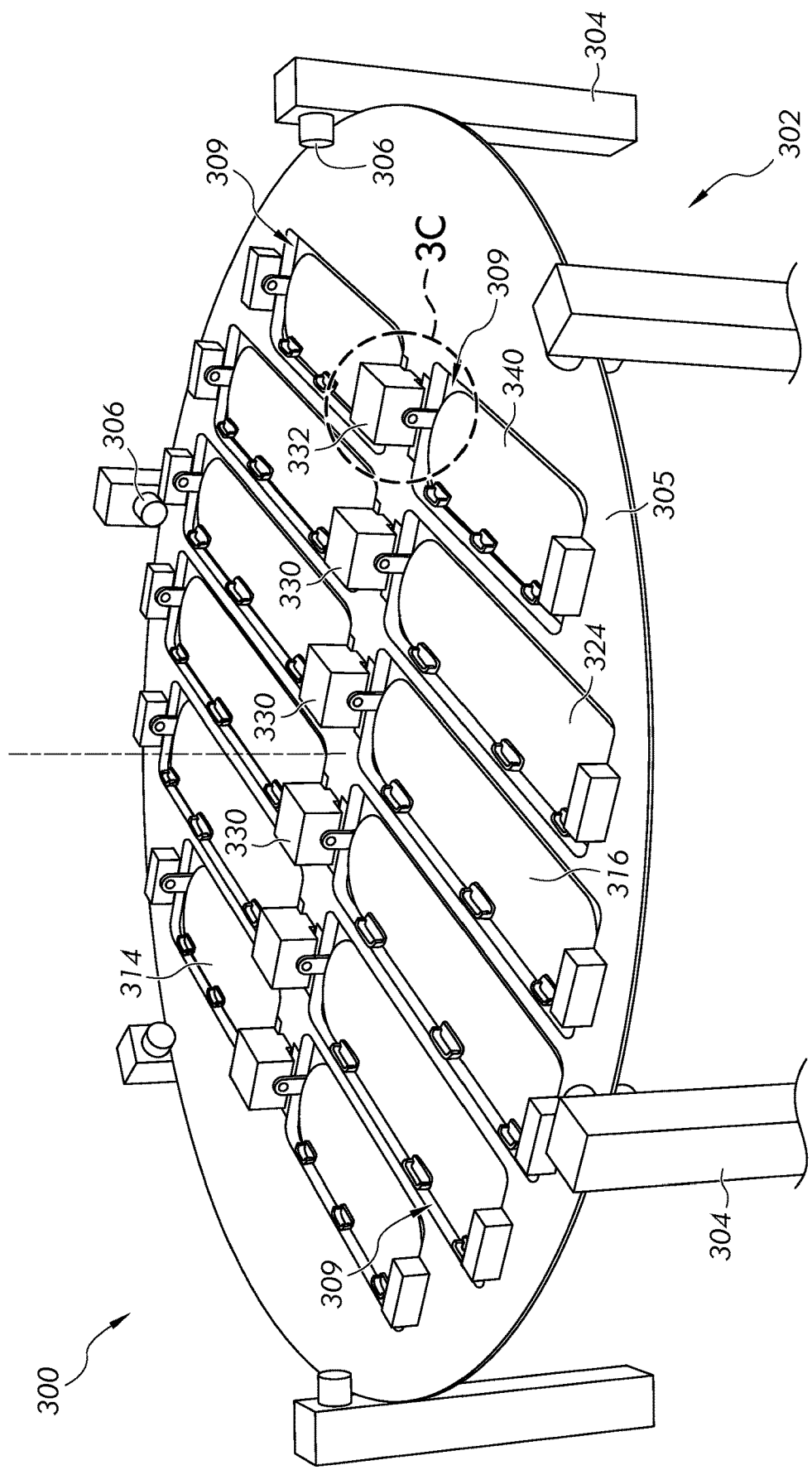
FIG. 3B schematically depicts the reflector array depicted in FIG. 3A with the plurality of reflectors rotated to a stowed position; according to one or more embodiments described herein.
Figure 3C:
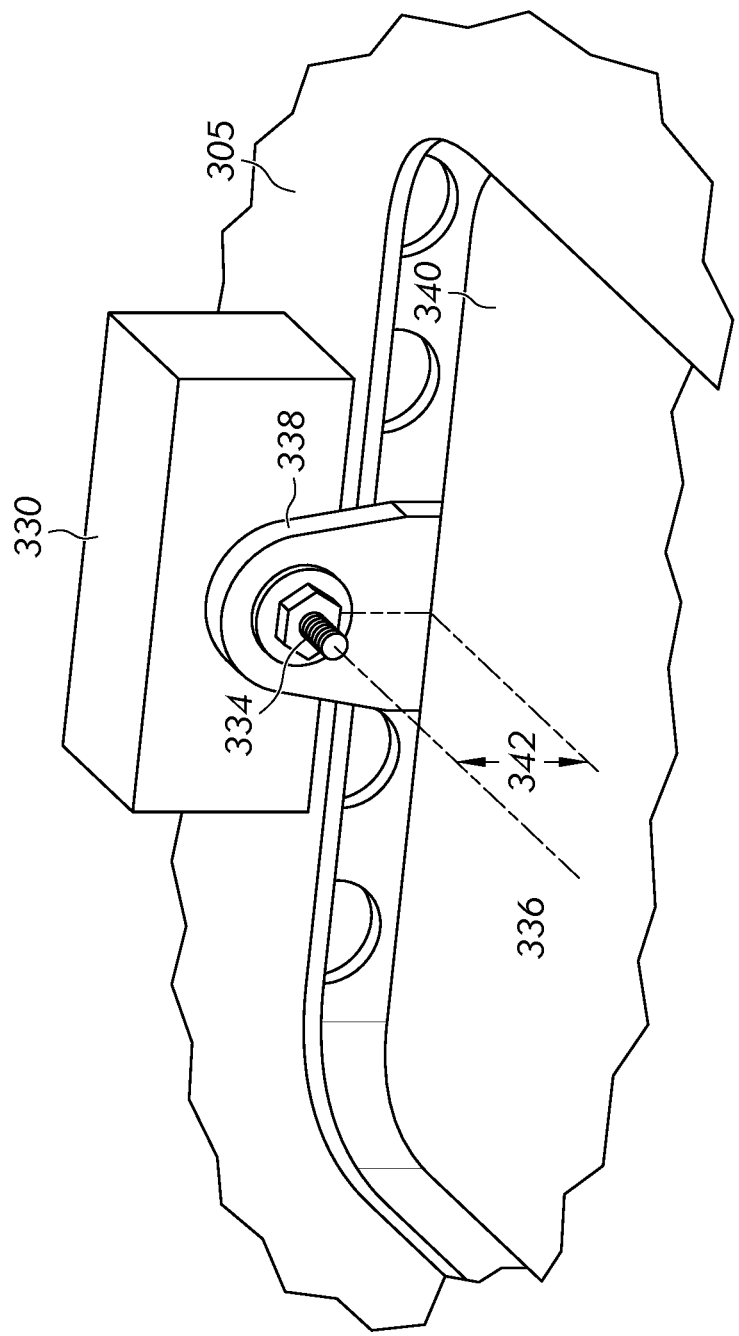
FIG. 3C schematically depicts an elevation adjustment actuator of the reflector array depicted in FIG. 3A, according to one or more embodiments described herein.

Referring now to FIGS. 3A, 3B, and 3C, another reflector array 300 is schematically depicted. In embodiments, the reflector array 300 may be used in place of the reflector array 104 (or in addition to) in the imager characterization system 100 depicted in FIG. 1. In the depicted embodiment, the reflector array 104 includes a plurality of reflectors 312. FIG. 3A depicts the reflector array 300 with a plurality of reflectors 312 in a reflecting position where the reflector array 300 is positioned to direct light from the illumination source 102 into the field of view of the imaging system 112. FIG. 3B depicts the reflector array 300 in a stowed position where the plurality of reflectors 312 are not reflecting light from the illumination source 102 towards the imaging system 112. FIG. 3C depicts a detailed view of one of the elevation adjustment actuators of the reflector array 300. As can be seen by comparing FIG. 3A to FIG. 2A, the reflector array 300 comprises a greater number of reflectors than the reflector array 104 described with respect to FIGS. 2A, 2B, and 2C. The plurality of reflectors 312 includes more than 50 reflectors.

As depicted in FIG. 3A, the reflector array 300 includes a support structure 302 supporting the plurality of reflectors 312 in a plane above the surface upon which the reflector array 300 is disposed. The support structure includes a base 303 and a rotating support 308 coupled to the base 303. Each of the plurality of reflectors 312 is connected to the base 303 via the rotating support 308. In embodiments, the base 303 may be stationary in the reference frame of the surface upon which the reflector array 300 is disposed. The base 303 provides structural support for the plurality of reflectors 312 and maintains positioning of the plurality of reflectors 312 during use. The base 303 includes a plurality of legs 304. Each of the plurality of legs 304 includes an engagement assembly 306 that receives and secures the rotating support 308. It should be understood that, while the depicted embodiment includes a single rotating support 308 coupled to each of the plurality of legs 304, alternative embodiments may include a plurality of such rotating supports 308, with only a portion of the plurality of legs 304 engaging with each rotating support 308. While the base 303 is depicted as incorporating a plurality of legs 304, the base 303 may take a number of different forms depending on the size of the reflector array 300 supported thereby (e.g., number and size of reflectors) and the operational environment of the reflector array 300. For example, in embodiments, the base 303 may include a single support platform centrally disposed relative to the rotating support 308. In embodiments, the base 303 may define a single surface upon which the rotating support 308 is disposed.

In the depicted embodiment, each engagement assembly 306 is a roller assembly disposed on a surface of one of the legs 304. Each roller assembly includes a pair of rollers between which the rotating support 308 is disposed. Attachment of the rotating support 308 to the base 303 via rollers beneficially permits rotation of the rotating support 308 relative to the base 303 in the manner described herein and maintains planarity of the rotating support 308 by providing a plurality of points of support. Such maintenance of the shape of the rotating support 308 beneficially maintains the pointing accuracy of the plurality of reflectors 312 because, if the rotating support 308 is bent, actual pointing directions of the plurality of reflectors 312 may vary from intended directions if the bending is unaccounted for in the control of the reflector array 300. The rollers also beneficially suppress vibration modes associated with the structure of the rotating support 308. Embodiments are also envisioned where each engagement assembly 306 comprises a single roller (e.g., disposed beneath the rotating support 308).

The rotating support 308 differs in structure from the rotating support 206 described herein with respect to FIGS. 2A, 2B, and 2C in that the rotating support 308 is a circular plate having a plurality of openings 309 disposed therein, whereas the rotating support 206 is a substantially ring-shaped member defining a single opening in which the plurality of reflectors 214 are disposed. In the reflector array 300, the plurality of reflectors 312 are arranged in a plurality of groupings of reflectors 315, with each reflector in each of the plurality of groupings of reflectors 315 being disposed proximate to one of the openings 309. Such an arrangement facilitates incorporation of a relatively large number of reflectors while allowing different groupings of the plurality of groupings of reflectors 315 to be independently rotated. Additionally, the plate-like nature of the rotating support 308 facilitates the reflector array 300 having a low profile design to reduce environmental effects.

Each grouping of reflectors of the plurality of groupings of reflectors 315 is disposed on one of a plurality of reflector support elements 313. The plurality of reflector support elements 313 each extend parallel one another, and each of the plurality of groupings of reflectors is a portion of a row of reflectors. That is, the reflector array 300 includes a plurality of parallel rows of reflectors. Such an arrangement facilitates efficient co-alignment of the plurality of reflectors by rotation of the rotating support 308 about an array axis of rotation 310. An array actuator (not depicted) may be centrally disposed beneath the rotating support 308. In embodiments, the array actuator is similar in structure to the array actuator 208 described herein with respect to FIGS. 2A and 2B, and provides controllable rotation of the plurality of reflectors 312 in unison about the array axis of rotation 310.

Each of the plurality of reflector support elements 313 is a plate disposed proximate to one of the openings 309 in the rotating support 308. In the depicted embodiment, the plurality of reflector support elements 313 are sized based on their position on the rotating support 308 as well as a number of reflectors disposed thereon. In embodiments, each grouping of reflectors comprises a plurality of reflectors having a constant spacing (e.g., outer peripheral edges of adjacent reflectors may be separated from one another by a common minimum separation distance). For example a first reflector support element 314 of the plurality of reflector support elements 313 includes a first grouping of reflectors 318. Each reflector in the first grouping of reflectors 318 has the same size and shape. Due to the proximity of the first reflector support element 314 to the peripheral edge of the rotating support 308, the first grouping of reflectors includes only three reflectors.

A second reflector support element 316 of the plurality of reflector support elements 313 includes a second grouping of reflectors 320. Because the second reflector support element 316 is centrally located on the rotating support 308, the second reflector support element 316 is larger than the first reflector support element 314 and therefore includes a greater number of reflectors. Like the first grouping of reflectors 318, each reflector in the second grouping of reflectors 320 has the same size and shape. In embodiments, the reflectors of the second grouping of reflectors 320 are the same size as the reflectors in the first grouping of reflectors 318, and have the same spacing. Embodiments are envisioned where different reflector support elements include groupings of reflectors differing in at least one of size, shape, and spacing. For example, the depicted embodiment includes a third reflector support element 322 of the plurality of reflector support elements 313 that includes a third grouping of reflectors 324. The third grouping of reflectors 324 includes five reflectors, the five reflectors including a first reflector 326 and a second reflector 328. The first reflector 326 has a size and shape that is similar to the reflectors of the first and second groupings of reflectors 318 and 320. The second reflector 328 is shaped differently and generally smaller than the first reflector 326. As exemplified by the third grouping of reflectors 315, the reflector array 300 may include a plurality of different mirror geometries to facilitate targeting of a wide range of sensors (e.g., with smaller detector element size or IGFOV than those targeted through reflectors similar to the first reflector 326). Each grouping of the plurality of groupings of reflectors 315 may include any combination of reflector geometries (e.g., varying in reflector elements size, spacing, coating, geometry, and the like) to facilitate the targeting of a wide variety of sensors.

Referring now to FIG. 3B, the reflector array 300 further includes a plurality of elevation adjustment actuators 330. Each of the elevation adjustment actuators 330 is disposed between two of the openings 309 in the rotating support 308. In embodiments, each of the elevation adjustment actuators 330 is coupled to a pair of the plurality of reflector support elements 313 to facilitate simultaneous rotation of the pair of reflector support elements between reflecting positions (such as the reflecting position of the plurality of reflectors 312 depicted in FIG. 3A) and the stowed position depicted in FIG. 3B. Each pair of the reflector support elements forms a row of reflectors. As such, each elevation adjustment actuator 330 is configured to adjust an elevation angle of an entire row of reflectors simultaneously. Alternative embodiments where each reflector support element has its own elevation adjustment actuator are also envisioned. Embodiments are also envisioned where the reflector array 300 includes less elevation adjustment actuators 330 than rows of reflectors, and mechanical linkages between various combinations of the rows may be used to facilitate simultaneous rotation of any combination of rows via a single one of the elevation adjustment actuators 330.

As depicted in FIG. 3B, when the plurality of reflector support elements 313 are placed in the stowed position, none of the plurality of reflectors 312 are visible, as each of the plurality of reflectors points underneath the rotating support 308 towards the surface on which the reflector array 300 is disposed. Such a configuration facilitates protecting reflective surfaces of the plurality of reflectors 312 from external debris. While FIG. 3B depicts each of the plurality of reflector support elements 313 in the stowed position simultaneously, it should be understood that each of the plurality of reflector support elements 313 may be stowed individually or in any pattern with any sub-combination other ones the plurality of reflector support elements 313. This way, the amplitude of the illumination light reflected by the reflector array 300 may be adjusted to facilitate characterizing imaging systems with a wide variety of signal amplitudes.

FIG. 3C depicts a close-up view of the area 332 of FIG. 3B. The elevation adjustment actuator 330 is disposed on the surface 305 of the rotating support 308. Each elevation adjustment actuator 330 includes a rotating element 334 that rotates about an elevation axis 336. A rotating arm 338 is attached to the rotating element 334 such that the rotating arm 338 rotates in conjunction with the rotating element 334. The rotating arm 338 extends substantially perpendicular to the elevation axis 336. A reflector support element 340 (i.e., one of the plurality of reflector support elements 313) is attached to the rotating arm 338 (e.g., at a peripheral edge thereof) such that the reflector element 340 is offset by a distance 342 from the elevation axis 336. The reflector element 340 thus rotates around the elevation axis 336 (e.g., with a rear surface of the reflector element 340 facing the elevation axis 336). In embodiments, the distance 342 is equal to a distance between the elevation axis 336 and the upper surface 305 of the rotating support 308 such that, when the reflector element 340 is rotated to the stowed position, the rear surface of the reflector element 340 is co-planar with the upper surface 305. That is, when all of the plurality of reflectors 312 are placed in the stowed position, the rear surfaces of the plurality of reflector support elements 313 and the upper surface 305 are co-planar to form a substantially smooth surface. Such a smooth surface suppresses the effects of wind conditions when the reflector array 300 is exposed to a harsh environment.

Figure 4A:
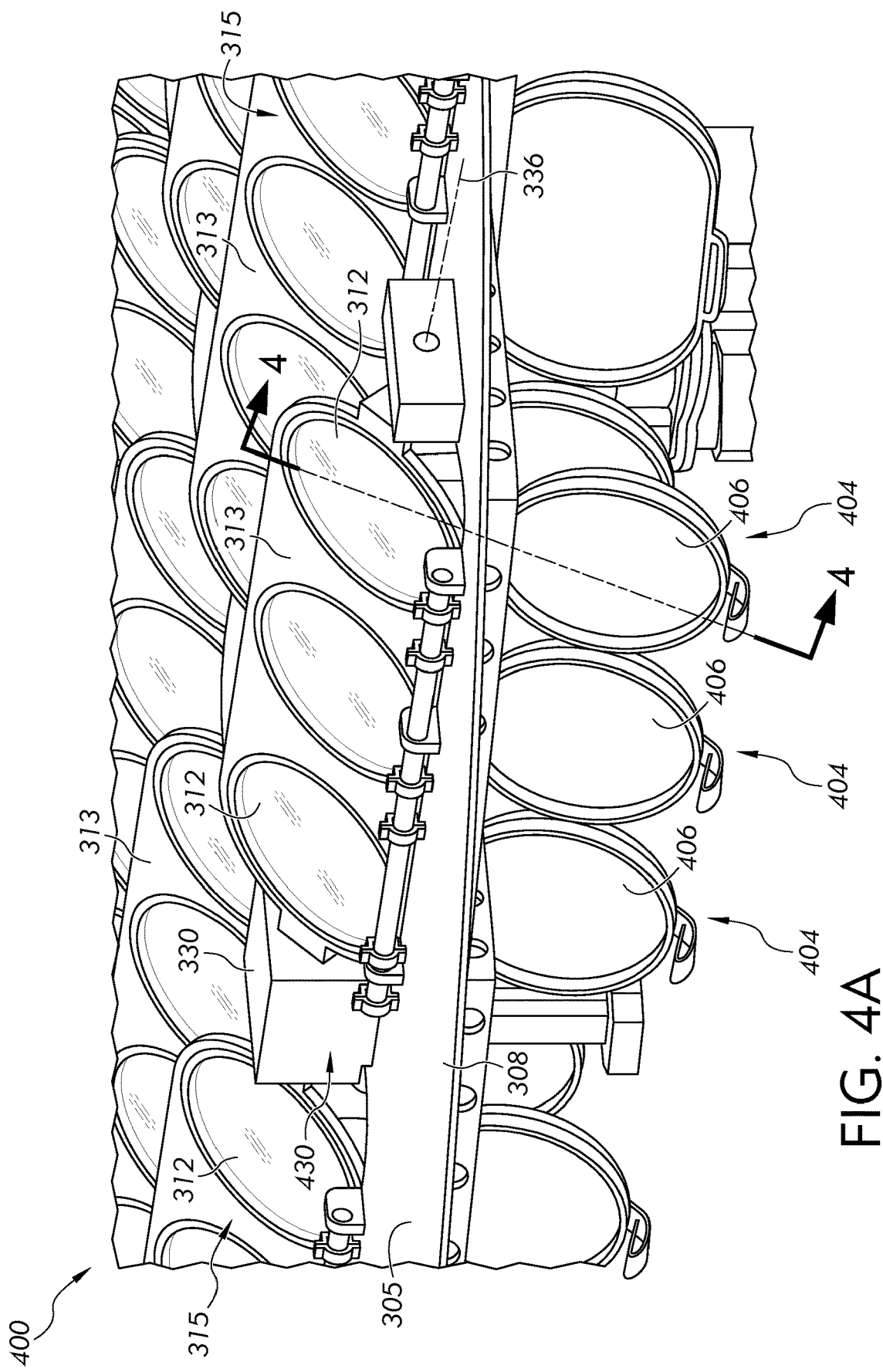
FIG. 4A schematically depicts a reflector array with a plurality of reflectors in a reflecting position, according to one or more embodiments described herein.
Figure 4B:
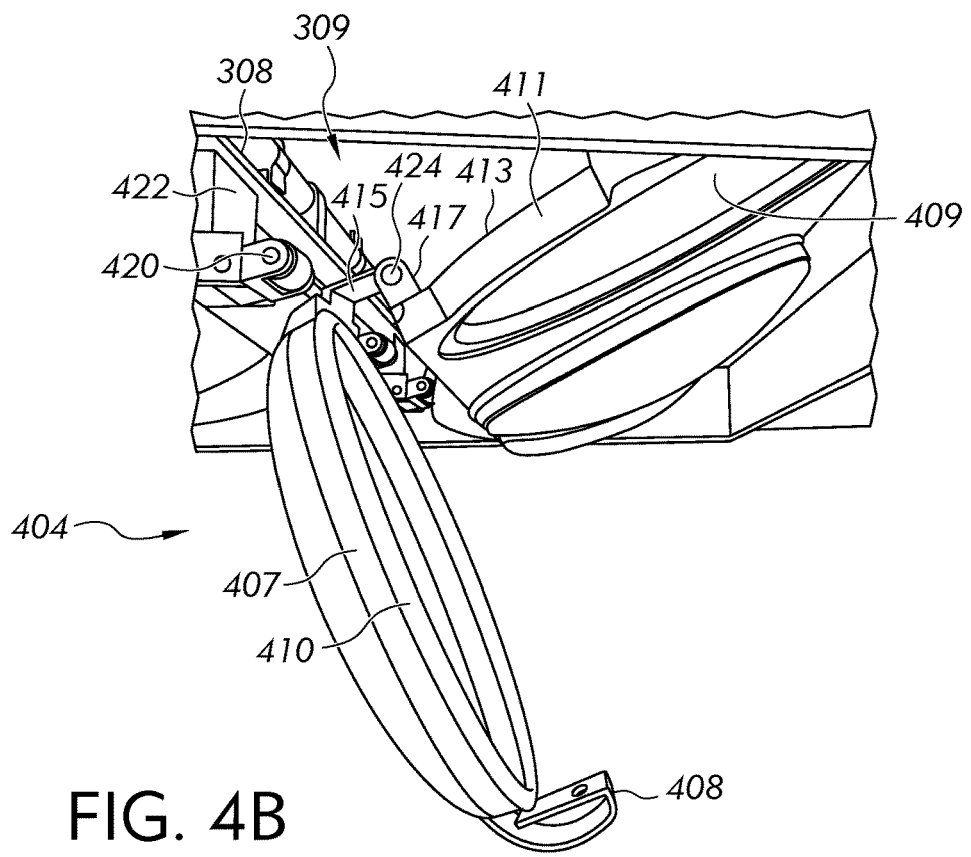
FIG. 4B schematically depicts a reflector of the reflector array of FIG. 4A being rotated from the reflecting position such that a reflector cover associated therewith is moved towards the reflector; according to one or more embodiments described herein FIG. 4C schematically depicts a reflector of the reflector array of FIG. 4A being rotated from the reflecting position such that the reflector cover associated therewith is moved towards the reflector; according to one or more embodiments described herein FIG. 4D schematically depicts a reflector of the reflector array of FIG. 4A after the reflector cover engages with a reflector support element associated with the reflector, according to one or more embodiments described herein.
Figure 4C:
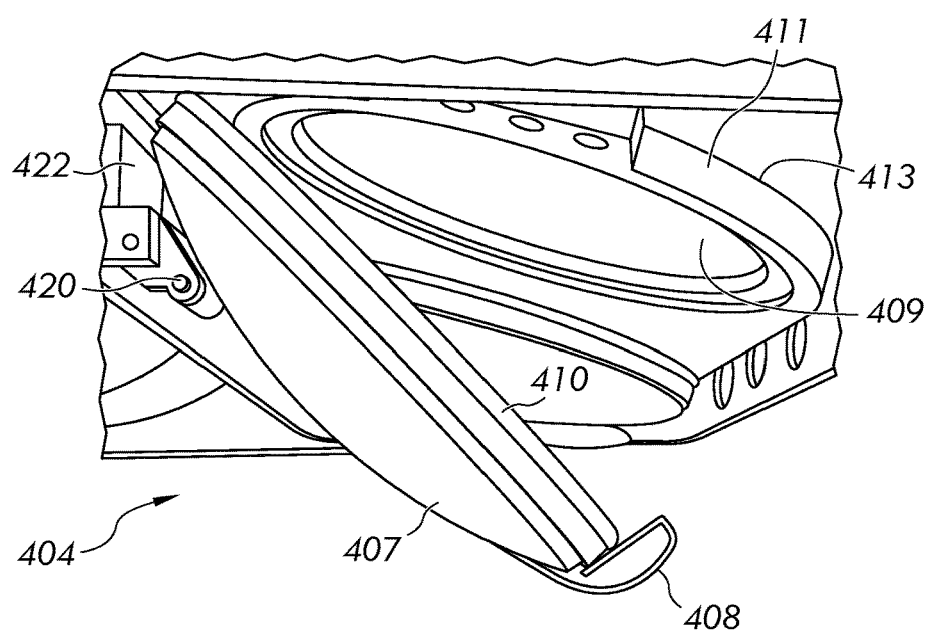
FIG. 4E schematically depicts a cross-sectional view of a cover latch that engages with the reflector cover to secure the reflector cover over the reflector, according to one or more embodiments described herein.
FIG. 4F schematically depicts a portion of a cleaning assembly of the reflector array depicted in FIG. 4A, according to one or more embodiments described herein.
Figure 4D:
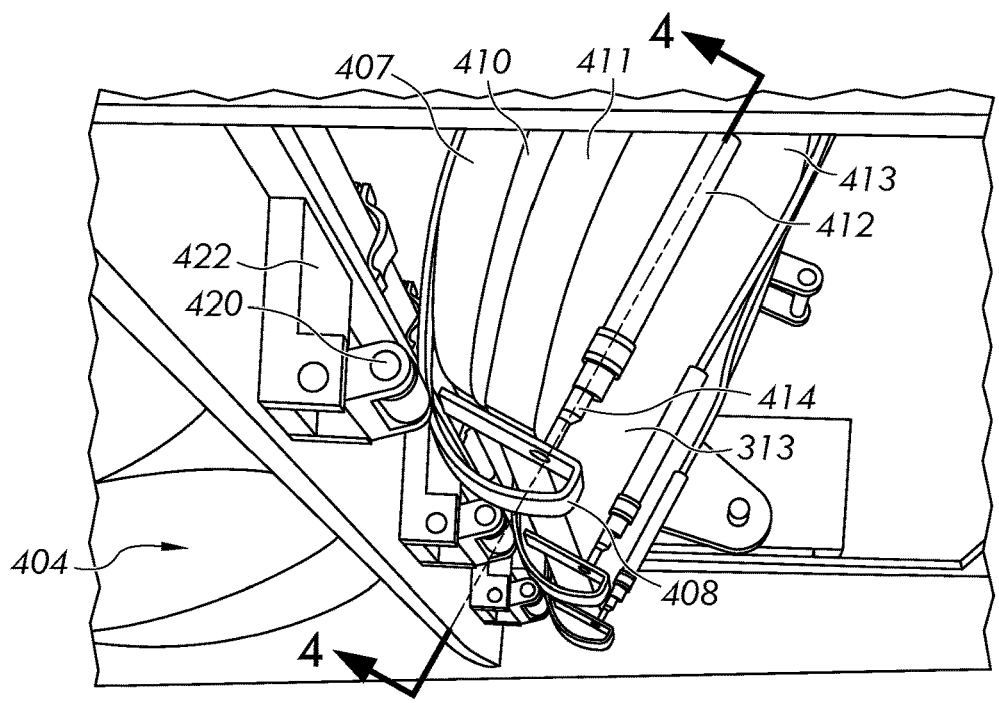
Figure 4E:
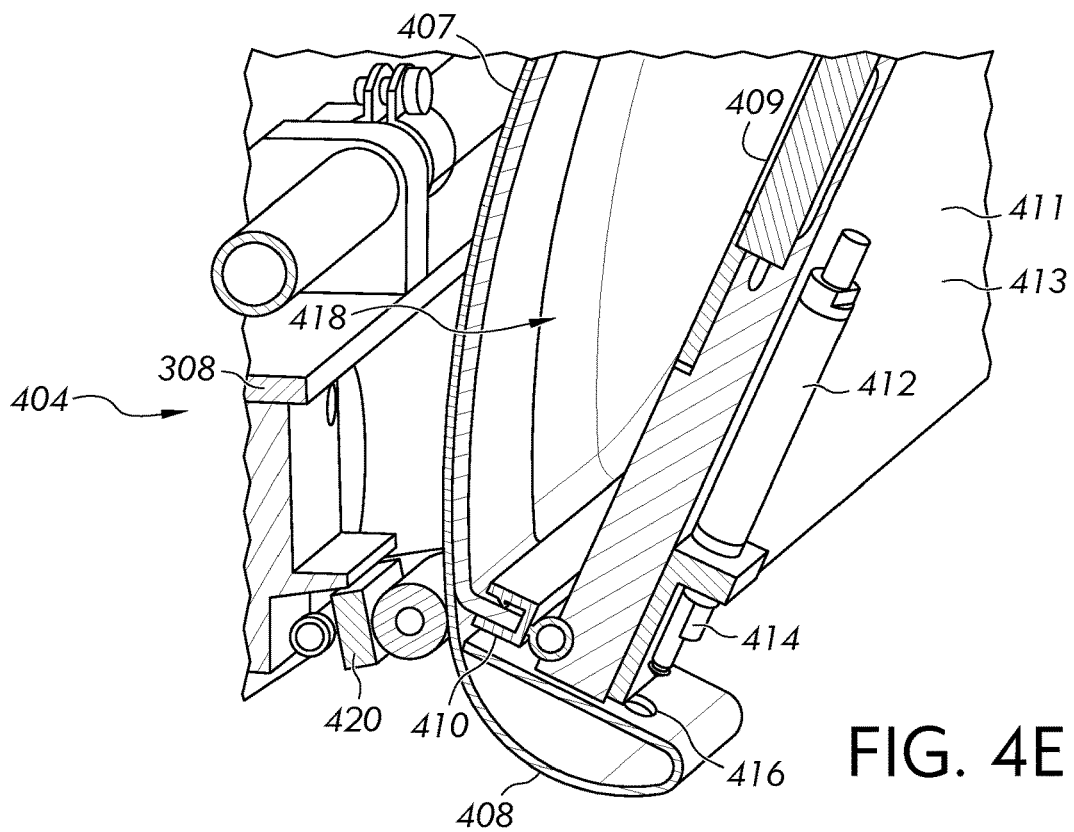
Figure 4F:
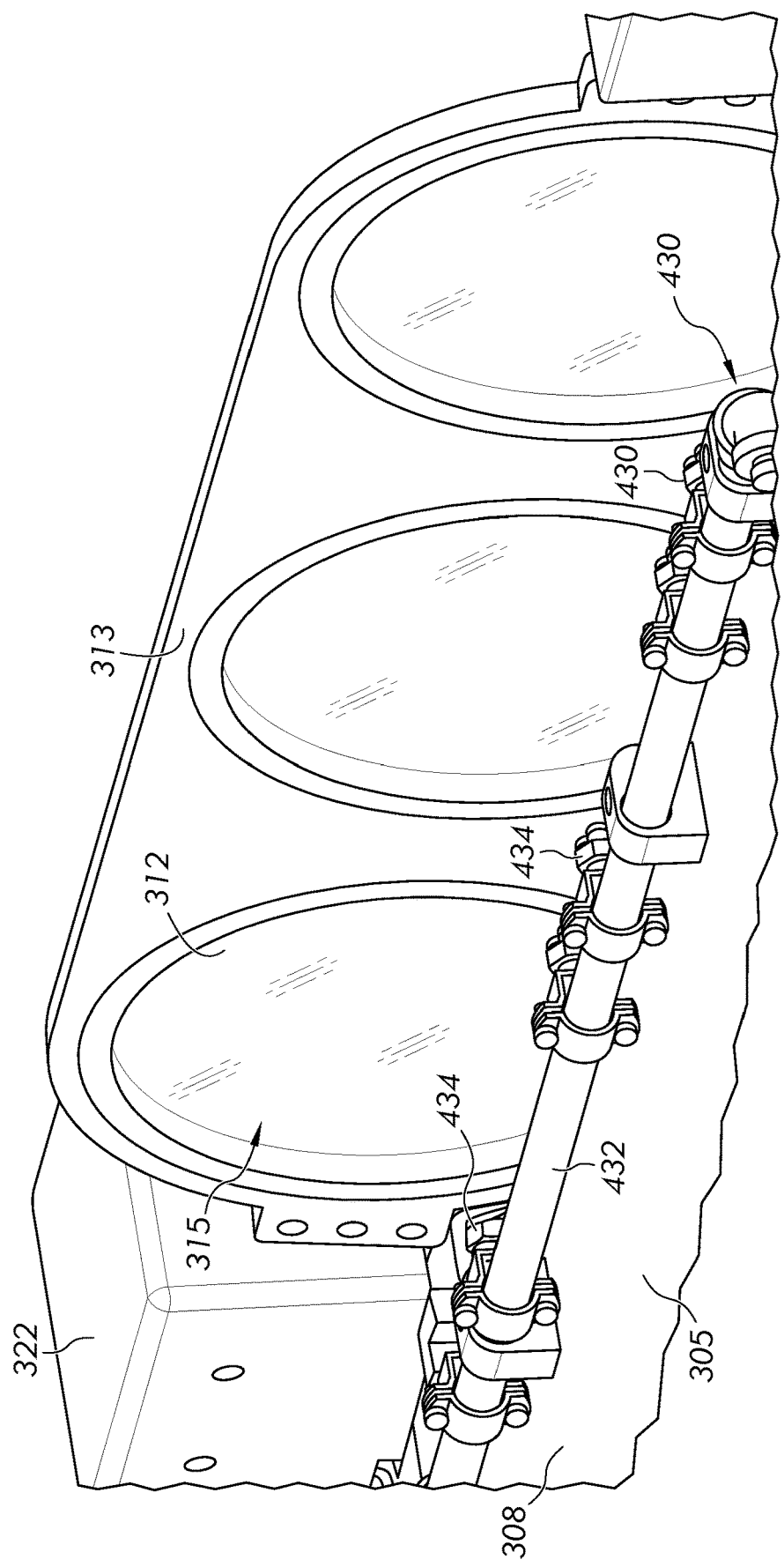

FIGS. 4A, 4B, 4C, 4D, 4E, and 4F schematically depict another reflector array 400. FIG. 4A depicts a perspective view of a portion of the reflector array 400 with a plurality of reflectors in a reflecting position. FIG. 4B schematically depicts a perspective view of a cover assembly 404 and an associated one of the plurality of reflectors 312 while the reflector is being moved towards a stowed position. FIG. 4C schematically depicts a perspective view of a cover assembly 404 and an associated one of the plurality of reflectors 312 while the reflector is being moved towards a stowed position. FIG. 4D schematically depicts a perspective view of a cover assembly 404 and an associated one of the plurality of reflectors 312 while the reflector is being moved towards a stowed position. FIG. 4E depicts a sectional view of a cover assembly 404 of the reflector array 400 when the cover assembly 404 is covering one of the plurality of reflectors 312 through the line 4-4 depicted in FIG. 4D. FIG. 4F schematically depicts a detailed view of a portion of a cleaning assembly 430 of the reflector array 400. The reflector array 400 may be similar in structure to the reflector array 300 described herein with respect to FIGS. 3A, 3B, and 3C. Accordingly like reference numerals may be used in FIGS. 4A, 4B, 4C, 4D, 4E, and 4F to indicate the incorporation of like components. While not depicted in 4A, 4B, 4C, 4D, 4E, and 4F, the reflector array 400 includes the support structure 302 and base 303 described herein with respect to FIGS. 3A, 3B, and 3C that support the rotating support 308 and permit rotation of the rotating support 308 about the array axis of rotation 310. The reflector array 400 differs from the reflector array 300 in that the reflector array 400 includes a plurality of reflector cover assembles 404 and a cleaning assembly 430.

In the embodiment depicted in FIG. 4A, the reflector array 400 comprises a plurality of cover assemblies 404, with each cover assembly of the plurality of cover assemblies 404 being associated with one of the plurality of reflectors 312. Each cover assembly 404 is shown to include a reflector cover 406. In embodiments, each reflector cover 406 covers one or more of the plurality of reflectors 312 of the reflector array 400. In embodiment, each reflector cover 406 may be latched to cover one of the plurality of reflectors 312 via a cover latch (not depicted in FIG. 4A) once the reflector cover 406 engages with one of the reflector support elements 313. That is, each reflector of the plurality of reflectors 312 has a reflector cover-latch pair associated therewith including one of the plurality of reflector covers 406 and a cover latch (e.g., similar to the cover latch 412 described with respect to FIGS. 4D and 4E). As depicted in FIG. 4A, when the plurality of reflectors 312 are in a reflecting position to reflect light towards a target, the reflector covers 406 are stowed beneath the rotating support 308 so as to not obstruct the fields of view of the plurality of reflectors 312. Such a configuration is facilitated by a rotatable connection between the reflector covers 406 and plurality of reflectors 312 (or, in the depicted embodiment, rotatable connections between the reflector covers 406 and the plurality of reflector support elements 313). While the depicted embodiment incorporates a reflector cover assembly 404 for each of the plurality of reflectors 312, it should be understood that alternative configurations are contemplated and within the scope of the present disclosure. For example, in embodiments, the reflector array 400 may include single reflector cover assembly (e.g., including a single reflector cover 406 and associated rotating connection and cover latch) for an entire one of the reflector support elements 313. In such embodiments, each reflector cover 406 may cover all of the reflectors disposed on the reflector support element to which that reflector cover 406 is attached. Certain embodiments may include ones of the reflector covers 406 that differ in size from the others based on the size of the reflector that the reflector cover covers. (e.g., the second reflector 328 described herein with respect to FIG. 3A may have a cover that is smaller in size than the reflector cover 406 depicted in FIG. 4A).

Because the reflector covers 406 are rotatably coupled to the reflector support elements 313, as the reflect support elements 313 are rotated to and from a stowed position (e.g., similar to the stowed position of the reflector array 300 depicted in FIG. 3B), the relative positioning between the reflector cover 406 and its associated one of the plurality of reflectors 312 changes when the reflector cover 406 is not latched to its associated reflector support element. FIGS. 4B, 4C, and 4D depict a rotational sequence of one of the reflector cover assemblies 404 including a reflector-cover latch-pair that covers a reflector 409 of the plurality of reflectors 312 disposed on a reflector support element 411 of the plurality of reflector support elements 313. FIG. 4B depicts the reflector 409 rotated in a clockwise direction from the reflecting position depicted in FIG. 4A to a first non-reflecting position. The reflector 409 points downwards towards the surface upon which the reflector array 400 is disposed. As shown, with the mirror in the non-reflecting position depicted in FIG. 4B, the reflector cover 407 extends at an angle of approximately 90 degrees from the reflector 409 (less than the angular difference depicted in FIG. 4A). The reflector cover 407 is rotatably coupled to the reflector support element 411 via a hinged connection 424 attached to a rear surface 413 of the reflector support element 411. In embodiments, the hinged connection 424 includes a connection arm 415 extending from a main body of the reflector cover 407. The connection arm 415 may include a rod, axle, or the like disposed on an end thereof that is inserted into opening in a cover connection element 417 extending from the rear surface 413. The rod coupled to the connection arm 415 may not be tightly secured in the opening to allow the reflector cover 407 to rotate relative to the reflector 409 as the reflector support element 411 rotates.

As depicted in FIG. 4B, the cover assembly 404 also includes a roller 420 extending beneath one of the plurality of openings 309 in the rotating support 308 towards the reflector support element 411. The roller 420 is attached to the rotating support 308 via a roller connector 422 disposed at an edge of the opening 309 in the rotating support 308 associated with the reflector support element 411. When in the position depicted in FIG. 4B, the reflector cover 407 is not in contact with the roller 420. FIG. 4C depicts the reflector 409 rotated in a clockwise direction from the first non-reflecting position depicted in FIG. 4B to a second non-reflecting position. In the second non-reflecting position depicted in FIG. 4C, the reflector 409 is closer to the reflector cover 407 than when in the first non-reflecting position depicted in FIG. 4B. As depicted in FIG. 4C, as the reflector support element 411 rotates from the first non-reflecting position of FIG. 4B, the roller 420 engages with a surface of the reflector cover 407 and pushes the reflector cover 407 towards the reflector 409. As the reflector support element 411 further rotates in a clockwise direction from the second non-reflecting position, the roller further exerts force on the reflector cover 407 and the reflector cover 407 is further pushed towards the reflector 409.

FIG. 4D depicts the reflector 409 rotated in a clockwise direction from the second non-reflecting position depicted in FIG. 4C. As shown, the reflector cover 407 is substantially flush with the reflector support element 411 such that the reflector 409 is not visible in FIG. 4D. That is, the reflector 409 is completely encapsulated from the external environment of the reflector array 400 within a cavity defined by the reflector cover 407 and the reflector support element 411.

The reflector cover 407 is shown to include gasket material 410 extending around a peripheral edge of the surface that engages with the reflector support element 411. The gasket material 410 may comprise a compressible foam or other sealing suitable material that seals off the cavity extending between the reflector cover 407 and the reflector support element 411 when the reflector cover 407 is pressed against the reflector support element 411 via the roller 420.

Once the reflector cover 407 engages with the surface of the reflector support element 411 at the gasket material 410, the reflector cover 407 may be secured thereto in a covering position via a cover latch 412 disposed on the rear surface 413 of the reflector support element 411. In embodiments, the cover latch 412 includes solenoid-based actuator (e.g., an electric solenoid, a pneumatic solenoid, or other suitable closing mechanism) including a latching pin 414. The solenoid-based actuator may move the latching pin 414 from an un-latched position (depicted in FIG. 4D) where the latching pin 414 is not engaged with the reflector cover 407, to a latched position, where the latching pin 414 engages with a latching extension 408 extending from a main body of the reflector cover 407 along a peripheral edge of the reflector support element 411. FIG. 4E depicts a cross-sectional view of the cover assembly 404 when in the third non-reflecting position depicted in FIG. 4D. As shown, when the gasket material 410 of the reflector cover 407 is pressed against the reflector support element 411, the latching extension 408 extends beyond the rear surface 413. An opening 416 in the latching extension 408 is exposed behind the surface 413. The latching pin 414, when pressed into the latching position via the cover latch 412, extends through the opening 416 and supports the rear surface 413 in a closed position. That is, the compression of the gasket material 410 obtained via the roller 420 pressing against the reflector cover 407 may be retained via actuating the cover latch 412, keeping the reflector 409 in the sealed cavity defined by the reflector cover 407 and the reflector support element 411.

The latching pin 414 may be maintained in the sealed position (e.g., when the latching pin 414 extends through the opening 416) irrespective of the rotational position of the reflector support element 411. That is, once covered, the reflector 409 may be rotated back to the rotating position of FIG. 4A, but covered via the reflector cover 407 if the latching pin 414 is maintained in the sealed position. If the reflector cover 407 remains latched, the reflector 409 may be rotated to the non-reflecting positions depicted in FIGS. 4B and 4C, while the reflector 409 remains sealed. In embodiments, the cover latch of each reflector cover assembly 404 is independently controllable. Each reflector cover-latch pair may be independently latched such that, as the plurality of reflector support elements 313 are rotated to various positions, different patterns of reflectors may be covered depending on the manner with which the cover latches are controlled. If one of the reflector covers 406 is not latched, the reflector cover 406 will disengage with its associated one of the reflector support elements 313 when rotated to a non-reflecting position due to gravity and, once the reflector support element is rotated back to a reflecting position, the reflector cover 406 will be in the position depicted in FIG. 4A and stored in a manner that does not obstruct the reflector. Accordingly, the structure of the reflector cover assembly 404 described herein allows the covers to be stored so as to not disrupt the operations of the reflectors and provides a means for controlling the pattern of light reflected towards a target imaging system.

FIG. 4F depicts a close-up view of a cleaning assembly 430 of the reflector array 400. FIG. 4F depicts a portion of the cleaning assembly associated with one of the groupings of reflectors 315 disposed on one of the plurality of reflector support elements 313. The cleaning assembly 430 is generally configured to provide pressurized cleaning fluid to each of the plurality of reflectors 312 of the reflector array 400. The pressurized fluid may be applied to reflective surfaces of the plurality of reflectors 312 to expel dust or other debris therefrom while the reflector array 400 is deployed in use. As shown, the cleaning assembly 430 includes a cleaning fluid conduit 432 disposed on the upper surface 305 of the rotating support 308. The cleaning fluid conduit 432 is fluidly coupled to a fluid source (not depicted) containing a cleaning fluid. The cleaning fluid may include any suitable fluid for removing dust or debris from the plurality of reflectors 312. In embodiments, the cleaning fluid is air extracted from the environment of the reflector array 400. In embodiments, the fluid source is a pressurized fluid vessel disposed on the base 303. In embodiments, the fluid source is a pump fluidly coupled to supply tubes running between the fluid source and the cleaning fluid conduit 432. The fluid conduit 432 includes a plurality of nozzles 434 that eject cleaning fluid from the cleaning fluid conduit 432 in patterns that at least partially overlap reflective surfaces of the plurality of reflectors 312.

In the depicted embodiment, the cleaning fluid conduit 432 extends from a central region of the rotating support (e.g., proximate to the elevation adjustment actuator 330 rotating the depicted one of the reflector support elements 313) in a direction parallel to the plurality of reflector support elements 313. In embodiments, the entire cleaning assembly 430 may include a plurality of such fluid conduits extending proximate to each one of the plurality of reflector support elements 313. The plurality of nozzles 434 is shown to include three nozzles: one associated with each of the reflectors disposed on the one of the plurality of reflector support elements 313 that the cleaning fluid conduit 432 is disposed proximate to. In embodiments, the fluid conduit 432 (as well as any additional fluid conduits incorporated into the cleaning assembly 430) are fed cleaning fluid by a plurality of hoses or supply lines extending from a cleaning fluid source to the fluid conduit 432. Given that the cleaning fluid conduit 432 is disposed on the rotating support 308 and rotates about an array axis of rotation (e.g., similar to the array axis of rotation 310 described with respect to FIG. 3A), supply lines may extend through the base 303 at the array axis of rotation to prevent twisting of the supply lines. For example, in embodiments where the reflector array 400 incorporates an array actuator similar to the array actuator 208 described with respect to FIG. 2A, the supply lines may be run through an axle or rod (e.g., like the moving element 210) disposed at the array axis of rotation. The rod or axle may be hollow to allow room for the cleaning fluid supply lines.

In embodiments, each of the plurality of nozzles 434 is independently controllable such that cleaning fluid is sprayed therefrom onto an associated one of the plurality of reflectors at a selected time based on whether the reflector is covered and if the reflector is in a designated cleaning position. In embodiments, the reflectors are sprayed as the reflectors rotate through a stream of cleaning fluid emitted by the plurality of nozzles 434 such that entireties of the plurality of reflectors 312 are sprayed and cleaned. Each reflector may be cleaned immediately prior to being placed in a reflecting position, immediately prior to being stored, or after the reflectors are used to reflect light from the illumination source 102. Cleaning just after reflector use allows for removal any debris or dust that may have collected on the reflector during use. The use of the plurality of cover assemblies 404 to seal the cleaned reflectors off after cleaning ensures the cleanliness of the reflectors for their next use, irrespective of the amount of time that may pass between uses. The reflector array 400, by providing a plurality of reflectors that are independently rotatable, coverable, and cleanable, allows each reflector to operate on an independent cleaning and covering schedule based on its use.

Figure 5:
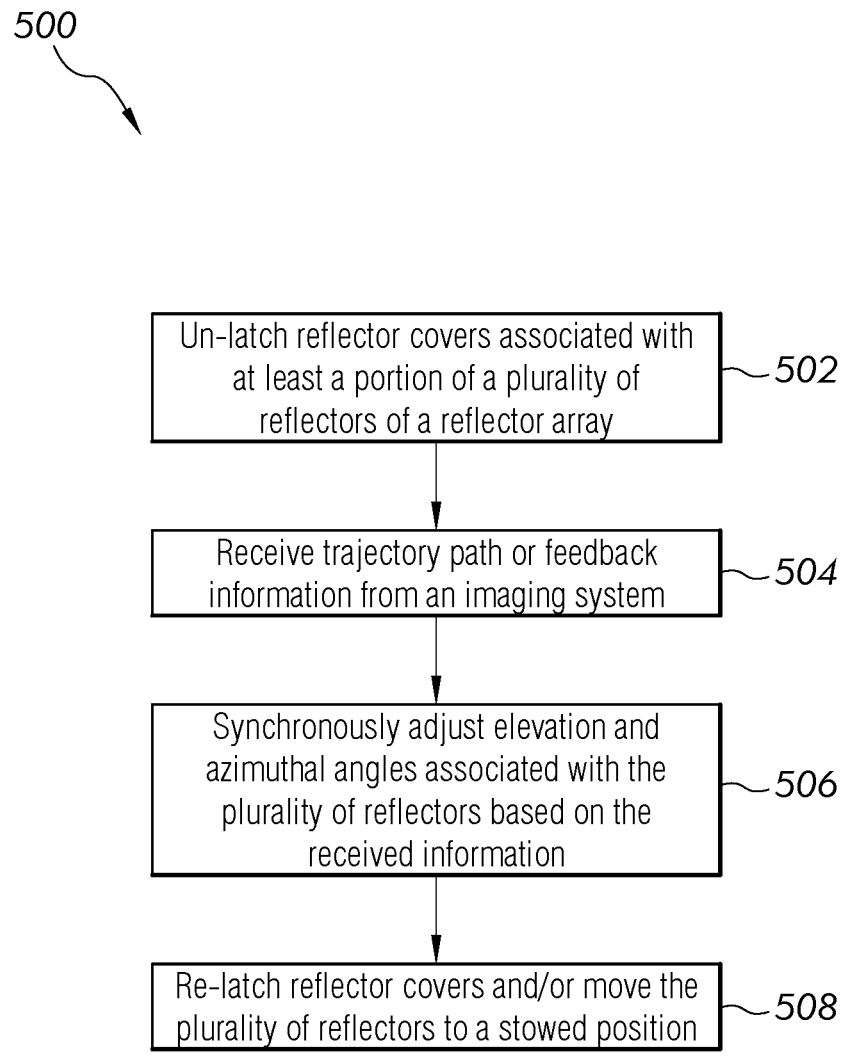
FIG. 5 depicts a flow diagram of a method of operating a reflector array to reflect light to an imaging system and cover a plurality of reflectors of the reflector array, according to one or more embodiments described herein.

Referring now to FIG. 5, a flow diagram of a method 500 of controlling a reflector array in use for calibrating an imaging system is shown. The method 500 may be performed via the control system 106 of the imager characterization system 100 depicted in FIG. 1. During the method 500, the imager characterization system 100 may include the reflector array 400 described herein with respect to FIGS. 4A, 4B, 4C, 4D, and 4F in order to direct light form the illumination source 102 to the imaging system 112 in order for the imaging system 112 to generate calibrating radiometric data. It should be noted that the method 500 may be performed by reflector arrays that are different in structure than the reflector array 400 described herein. For example, in embodiments, the reflector array 104 described herein with respect to FIGS. 2A and 2B may be used. The steps of the method 500 may differ from the description that follows depending on the overall structure and arrangement of the various components of the reflector array used.

In a step 502, reflector covers 406 associated with at least a portion of the plurality of reflectors 312 of the reflector array 400 are un-latched. In embodiments, for example, the method 500 begins with the plurality of reflectors 312 in the stowed position (similar to that depicted in FIG. 3B). In embodiments, un-latching of the reflector covers 406 are initiated in response to an indication of an upcoming calibration (e.g., the calibration may be prescheduled or a calibration request may generated by the imaging system 112 or other computing system and subsequently received by the control system 106). In embodiments, for example, the reflector array 400 may be a part of a calibration network for calibrating a plurality of different types of imaging systems. In embodiments, the imaging system (or a user thereof) may schedule a calibration of the imaging system 112 at a particular time by inputting a calibration request to a system in communication with the control system 106. The request may identify the imaging system 112 and provide access to location data of the imaging system 112 (e.g., in the form of real-time GPS data or scheduled locations of the imaging system 112). That is, at a predetermined calibration time, the control system 106 may unlatch the reflector covers 406 to facilitate an upcoming calibration. In embodiments, the reflector covers 406 that are un-latched are selected based on characteristics of the imaging system 112. For example, the number and/or size of the reflectors 312 may be selected based on a resolution or size of the imaging system 112. In embodiments, a pattern of reflector covers 406 are unlatched based on a type of calibration being performed. To un-latch the reflector covers 406, the controller 106 may send control signals to the cover latches 412 to disengage the latching pins 414 from the latching extensions 408 associated with each cover (see FIG. 4E).

In a step 504, trajectory path or feedback information from the imaging system 112 is received. For example, the controller 106 may receive data regarding the flight path of the imaging system 112 via a network interface. The imaging system 112 may also receive and/or generate data regarding the location of the illumination source 102. For example, based on measurements taken by the field spectral radiometer 108, the controller 106 may determine the location of the illumination source 102. In embodiments, the controller 106 may receive information regarding the illumination source 102 from sources other than the radiometer 108 (e.g., data regarding weather patterns and the like may be communicated to the control system 106 via the network interface). Based on the generated and/or received information regarding the illumination source 102, the controller 106 may determine pointing directions (e.g., associated with particular azimuthal and elevation angles) for the reflectors 312 having un-latched covers associated therewith.

In a step 506 elevation and azimuthal angles associated with the plurality of reflectors 312 are adjusted based on the information received at the step 504. As described herein, the azimuthal pointing direction extends perpendicular to the direction in which each of the plurality of groupings of reflectors 315 of the reflector array 400 is arranged. As described herein with respect to FIG. 3A, each of the plurality of groupings of reflectors 315 may be arranged as a portion of a row of reflectors extending in a particular direction. The azimuthal pointing direction may extend perpendicular to the rows such that adjustment of elevation angles of the reflectors directs light towards the imaging system 112. In embodiments (e.g., where the reflector array 400 does not include a plurality of rows of reflectors), the azimuthal direction is based on an arbitrary reference point or a specific reflector on the reflector array. The control system 106 may adjust the azimuthal pointing direction by providing actuation signals to an array actuator (e.g., similar to the array actuator 208 described with respect to FIG. 2A) defining an array axis of rotation of the reflector array 400. The array actuator may rotate the rotating support 308 to an azimuthal orientation determined based on the relative positioning of the imaging system 112.

As the azimuthal orientations of the plurality of reflectors 312 is being adjusted, elevation angles of at least a portion of the plurality of reflectors are adjusted such that at least a portion of the plurality of reflectors 312 reflects light from the illumination source 102 into the field of view of the imaging system 112. For example, the control system 106 may provide an actuation signal to one or more of the plurality of elevation adjustment actuators 330 to align a reflection direction of the reflectors towards the imaging system 112 based on the positioning determined in the step 502. As will be appreciated, the elevation and azimuthal angles to which the plurality of reflectors 312 are directed during the step 506 may depend on the location of the illumination source 102 relative to the reflector array 400. As such, the control system 106 may determine the position of the illumination source 102. In embodiments, the position of the illumination source 102 may be determined using a camera that may be disposed on a remote viewing head of the field spectral radiometer 108. In embodiments, the position of the illumination source 102 may be sent to the control system 106, or the control system 106 may store projected positions of the illumination source 102.

Based on the positions of the imaging system 112 and the illumination source 102, the control system 106 may provide actuation signals to the array actuator and the one or more elevation adjustment actuators 330 such that surface normals of the plurality of reflectors 312 are at an angle to an imaging axis of the imaging system 112 determined based on the position of the illumination source 102 and light is reflected to the imaging system 112. When in such a position, the portion of the plurality of reflectors 312 used in measurement may be in a position that resembles the reflecting position depicted in FIG. 4A. As such, the plurality of reflector covers 406 may extend through the openings 309 in the rotating support 308 away from reflective surfaces of the reflectors in use. Using the light reflected by the reflector array 400, the imaging system 112 generates an imaging signal from the light reflected by the reflector array 400. In embodiments, the imaging signal is relayed to a calibration system associated with the reflector array 104 for post-processing. For example, the imaging signal may be assembled with additional data collected by the field spectral radiometer 108 (e.g., including the radiance and/or irradiance of the illumination source 102, the reflectance of the surface upon which the reflector array 400 is disposed, the reflectance of the plurality of reflectors 312). The data collected by the field spectral radiometer 108 may be used to adjust the data generated by the imaging system 112 (e.g., background subtraction, adjustment for atmospheric transmission, etc.) such that the reflector array 400 provides a standardized reference point for calibrating the imaging system 112. In embodiments, the imaging signal generated via the imaging system 112 may contain spatial and geometric information regarding the performance of the imaging system 112. For example, in embodiments, each of the plurality of reflectors 312 in the reflector array 400 are sized to be smaller than field of view associated with a detecting element of the imaging system 112, and the imaging signal may be representative of a point spread function of the imaging system 112.

In embodiments the reflector array 104 may be in different configurations during tracking of the imaging system 112 to as to modulate the light signal provided thereto. Different configurations of the plurality of reflectors 312 may reflect light to the imaging system 112 to modulate the light signal reflected to the imaging system 112. For example, in embodiments, as the array actuator is rotating the plurality of reflectors to track the imaging system, the elevation adjustment actuators 330 may be activated to change the configuration of mirrors that are used to reflect light towards the imaging system. In an example, the reflector array 104 may begin a tracking sequence with the plurality of reflectors 312 in a reflecting position similar to that depicted in FIG. 4A (e.g., such that all of the plurality of reflectors 312 direct light towards the imaging system 112). After a predetermined period, one or more of the elevation adjustment actuators 330 may be activated to alter the angle of one or more rows of the plurality of reflectors 312 such that the reflectors in that row do not direct light towards the imaging system. By altering the number of the plurality of reflectors 312 that directs light to the imaging system 112 during tracking, the reflector array 104 provides a means to modulate the light used to generate images and characterize the imaging system 112. Various patterns of reflectors may be adjusted to generate a desired time-varying calibration light (e.g., a square wave, a triangular wave, etc.).

In a step 508, after imaging is complete, the reflector covers 406 may be re-latched and/or the plurality of reflectors 312 may be rotated back to the stowed position. For example, in embodiments, after imaging, the control system 106 may determine that the reflectors used in the measurement are ready for storage. In response to the storage readiness determination, the control system 106 may actuate the one or more elevation adjustment actuators 330 such that the reflectors used in measurement are rotated such that the portion of the plurality of reflector covers 406 are pressed against the plurality of reflector support elements 313 by the plurality of rollers 420 disposed at the openings 309 in the rotating support 308 (see FIGS. 4C-4E). In embodiments, between the time of measurement and when the reflective surfaces of the plurality of reflectors 312 are covered by the plurality of reflector covers 406, the plurality of nozzles 434 of the cleaning assembly 430 are opened and cleaning fluid from a cleaning fluid source is sprayed onto the reflective surfaces to remove any dust or other debris deposited thereon during the period of measurement. In embodiments, such cleaning may occur prior to measurement by the imaging system 112 (e.g., during an initial rotation of the elevation angles of the plurality of reflectors 312 after the plurality of reflector covers 406 disengage with the plurality of reflectors 312).

In embodiments, the plurality of cover latches 412 associated with each of the cover assemblies 404 are selectively engaged with the plurality of reflector covers 406 to maintain covering of at least a portion of the plurality of reflectors 312. Depending on the situation, after the plurality of reflector covers 406 are pressed against the ones of the plurality of reflector support elements 313 to which the plurality of reflector covers 406 are attached, the control system 106 may activate each of the cover latches 412 such that all of the plurality of reflectors 312 are covered after the measurement period, irrespective of the elevation angle to which they are rotated. In embodiments, any pattern of cover latches 412 may be activated such that, upon further rotation, a selected pattern of reflectors are exposed for successive measurements. Such a use exemplifies how the cover assemblies 404 disclosed herein provide an additional means of controlling the illumination signals used to calibrate imaging systems, while providing robust coverage in a manner that does not obstruct light from reaching the plurality of reflectors 312.

As will be understood from the foregoing description, it will be understood that using a rotatable support in a support structure for a plurality of reflectors of a reflector array is advantageous in that it provides a low-profile, scalable design for incorporating any desired number and arrangement in reflectors. The rotatable support permits each of the plurality of reflectors to be rotated in unison in an azimuthal direction about an array axis of rotation. Elevation adjustment actuators may be provided on the rotating support to permit each of the plurality of reflectors to be rotated about elevation axes extending perpendicular to the array axis of rotation such that the plurality of reflectors may be rotated to reflect light to imaging systems located in any location above the reflector array. The plurality of reflectors may be coupled to the rotatable support via reflector support elements having cover assemblies attached thereto. The cover assemblies may include reflector covers pivotally coupled to the reflector support elements and cover latches that engage with the reflector covers when the reflector covers are pressed against surfaces of the reflector support elements. By adjusting the elevation angles of the plurality of reflectors and controlling the cover latches, the reflector covers may be selectively engaged or disengaged to cover any portion of the plurality of reflectors to protect the reflectors while not in use. The pivotal connection between the reflector covers and the reflector support elements may allow the reflector covers to be stowed beneath the rotating support in a non-obstructing manner when the reflectors are in use.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A reflector array comprising:
 a base;
 a rotating support pivotally coupled to the base such that the rotating support is rotatable relative to the base in at least a first direction;
 an array actuator comprising a rotating element coupled to the rotating support, the rotating element defining an array axis of rotation of the rotating support;
 a plurality of reflectors attached to the rotating support such that the plurality of reflectors rotate in unison in conjunction with one another relative to the base as the array actuator rotates the rotating element about the array axis of rotation, wherein the plurality of reflectors comprises:
  a first reflector coupled to the rotating support via a first reflector support element; and
  a second reflector coupled to the rotating support via a second reflector support element, wherein the first reflector support element and the second reflector support element are rotatable to adjust angles of elevation thereof; and
 one or more elevation adjustment actuators rotating the first reflector support element to adjust an elevation angle of the first reflector and the second reflector support element to adjust an elevation angle of the second reflector.

2. The reflector array of claim 1, wherein the one or more elevation adjustment actuators rotate the first and second reflectors about axes extending parallel to a surface of the rotating support.

3. The reflector array of claim 1, wherein the plurality of reflectors comprises a plurality of groupings of reflectors, each grouping of reflectors comprising at least two reflectors that are each coupled to a reflector support element associated with that grouping, each reflector support element coupled to the one or more elevation adjustment actuators such that the elevation adjustment actuator associated with each grouping of reflectors rotates each reflector in that grouping of reflectors in unison.

4. The reflector array of claim 3, wherein each reflector support element comprises a reflector plate, wherein each reflector in each of the grouping of reflectors is disposed on a reflector surface of the reflector plate.

5. The reflector array of claim 4, wherein the one or more elevation adjustment actuators is configured to selectively rotate subsets of the reflector support elements as the array actuator is rotating the rotating support to modulate a reflected light signal.

6. The reflector array of claim 1, wherein:
the one or more elevation adjustment actuators adjust elevation angles of the first and second reflectors between a reflecting position and a stowed position; and
when the first reflector or the second reflector is in the stowed position, the surface normal of the reflector in the stowed position points towards a surface upon which the base is disposed.

7. The reflector array of claim 6, wherein:
the rotating support comprises an upper surface facing away from the surface upon which the base is disposed;
the one or more elevation adjustment actuators are disposed on the upper surface such that an elevation axis associated with each of the one or more elevation adjustment actuators is disposed above the upper surface; and
when the first reflector or the second reflector is in the stowed position, the reflector in the stowed position is either co-planar with the upper surface or disposed beneath the upper surface.

8. The reflector array of claim 5, further comprising:
a first reflector cover associated with the first reflector, the first reflector cover attached to the first reflector support element via a hinged connection disposed at an external edge of the first reflector support element such that the first reflector cover is rotatable with respect to the first reflector support element; and
a cover latch disposed on the first reflector support element, wherein, as the reflector rotates from the reflecting position to the stowed position, the first reflector cover rotates toward the first reflector and the cover latch engages with the first reflector cover to secure the reflector cover over the first reflector such that the first reflector is disposed in a cavity defined by the first reflector support element and the first reflector cover.

9. The reflector array of claim 8, wherein:
each reflector of the plurality of reflectors is disposed in an opening defined by an internal surface of the rotating support, the reflector array further comprises a roller disposed at an edge of the opening proximate to the first reflector support element, and
as the first reflector rotates from the reflecting position to the stowed position, the roller presses the first reflector cover towards the first reflector to seal the cavity.

10. The reflector array of claim 8, further comprising:
at least one additional reflector cover such that the reflector array comprises a plurality of reflector covers, each reflector cover coupled to a reflector support element on which a reflector associated with that reflector cover is disposed, wherein each reflector cover is coupled with that reflector cover's associated reflector support element via a hinged connection; and
at least one additional cover latch such that each reflector of the plurality of reflectors has a reflector cover-latch pair associated therewith such that cover latch secures the reflector cover over that reflector when that reflector is not in use.

11. The reflector array of claim 1, further comprising:
a cleaning fluid conduit connected to the base; and
a cleaning nozzle in fluid communication with the cleaning fluid conduit, the cleaning nozzle emitting cleaning fluid in a pattern that a least partially overlaps with one of the plurality of reflectors.

12. The reflector array of claim 11, wherein the cleaning fluid conduit extends through the rotating element of the array actuator.

13. The reflector array of claim 11, further comprising a plurality of elevation adjustment actuators, each one of the plurality of elevation adjustment actuators coupled to one or more of the plurality of reflector support elements to rotate each of the plurality of reflectors from the stowed position to reflecting positions where surface normals of the plurality of reflectors extend away from a surface on which the support structure is disposed.

14. The reflector array of claim 13, wherein, when one of the plurality of reflectors is in a reflecting position, the reflector cover associated with that reflector extends through the opening away from the reflector.

15. The reflector array of claim 14, further comprising a plurality of cover rollers disposed on the support structure at the opening, each of the cover rollers being associated with one of the plurality of reflector covers and disposed proximate to the reflector support element on which that reflector cover is disposed, wherein, when one of the reflectors is moved from a reflecting position towards the stowed position, the reflector roller presses the reflector cover against the reflector support element on which the hinged connection is disposed to seal the cavity.

16. The reflector array of claim 13, wherein each cover latch of the plurality of cover latches is disposed on the reflector support element of the reflector cover in that cover latch's latch-cover pair, each cover latch comprising a solenoid that is independently controlled so that an arbitrary pattern of reflectors may be maintained in a non-reflective state irrespective of the rotational position of that reflector.

17. A reflector array comprising:
a support structure;
a plurality of reflectors coupled to the support structure via a plurality of reflector support elements, wherein each of the reflector support elements is rotatable relative to the support structure such that the plurality of reflectors are movable to and from a stowed position, wherein each of the plurality of reflectors is disposed at an opening defined by the support structure;

a plurality of reflector covers, each of the reflector covers attached to a reflector support element proximate to at least one of the plurality of reflectors via a hinged connection disposed on the reflector support element; and a plurality of cover latches, each one of the plurality of cover latches forming a latch-cover pair with one of the plurality of reflector covers, wherein the relative positioning between each of the plurality of reflectors and an associated one of the plurality of reflector covers changes as that reflector rotates towards the stowed position such that the associated reflector cover engages with the cover latch in that reflector cover's reflector-latch pair at an engagement position to enclose a cavity in which the reflector is disposed.

18. A method of providing an illumination signal to a remote sensing system, the method comprising:

determining a positioning of the remote sensing system relative to a reflector array, the reflector array comprising:

a base;

a rotating support pivotally coupled to the base such that the rotating support is rotatable relative to the base about an array axis of rotation extending in a first direction;

an array actuator comprising a rotating element coupled to the rotating support, the rotating element defining the array axis of rotation; and a plurality of reflectors pivotally coupled to the rotating support via one or more elevation adjustment actuators, the plurality of reflectors rotatable about at least one elevation axis extending in a second direction;

based on the positioning, rotating the rotating support about the array axis of rotation via the array actuator such that the plurality of reflectors reflect light from an illumination source in an azimuthal direction towards the remote sensing system; and rotating at least a portion of the plurality of reflectors about the at least one elevation axis such that at least a portion of the plurality of reflectors direct light from the illumination source to a field of view of the remote sensing system.

19. The method of claim 18, wherein the illumination source comprises a natural light source, the method further comprising determining a positioning of the remote sensing system relative to the illumination source.

20. The method of claim 18, further comprising:

rotating at least a portion of the plurality of reflectors about the at least one elevation axis such that at least a portion of the plurality of reflectors are in a stowed position not reflecting the light from the illumination source; and latching a reflector cover to at least one of the plurality of reflectors such that the at least one reflector is completely covered by the reflector cover.

* * * * *